United States Patent
Sumiyoshi et al.

(10) Patent No.: US 9,759,548 B2
(45) Date of Patent: Sep. 12, 2017

(54) IMAGE PROCESSING APPARATUS, PROJECTOR AND PROJECTOR SYSTEM INCLUDING IMAGE PROCESSING APPARATUS, IMAGE PROCESSING METHOD

(75) Inventors: Shinichi Sumiyoshi, Kanagawa (JP); Fumihiro Hasegawa, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 518 days.

(21) Appl. No.: 14/238,689

(22) PCT Filed: Aug. 9, 2012

(86) PCT No.: PCT/JP2012/070784
§ 371 (c)(1),
(2), (4) Date: Feb. 12, 2014

(87) PCT Pub. No.: WO2013/024882
PCT Pub. Date: Feb. 21, 2013

(65) Prior Publication Data
US 2014/0204204 A1    Jul. 24, 2014

(30) Foreign Application Priority Data
Aug. 18, 2011 (JP) .................. 2011-178809

(51) Int. Cl.
*G01B 11/14* (2006.01)
*H04N 9/31* (2006.01)
(Continued)

(52) U.S. Cl.
CPC ............. *G01B 11/14* (2013.01); *G08G 1/168* (2013.01); *H04N 9/3185* (2013.01);
(Continued)

(58) Field of Classification Search
CPC .... G08G 1/168; H04N 9/3185; H04N 9/3194; G01B 11/14; G03B 17/54; G03B 21/53
(Continued)

(56) References Cited

U.S. PATENT DOCUMENTS

| 7,226,173 | B2 | 6/2007 | Aoyanagi |
| 2005/0131581 | A1* | 6/2005 | Sabe ................. G06K 9/00201 700/245 |

(Continued)

FOREIGN PATENT DOCUMENTS

| JP | 2004-069996 | 3/2004 |
| JP | 2004-088169 | 3/2004 |

(Continued)

OTHER PUBLICATIONS

Notice of Rejection issued Oct. 27, 2015 in Japanese Patent Application No. 2011-178809.
(Continued)

*Primary Examiner* — Zhihan Zhou
(74) *Attorney, Agent, or Firm* — Oblon, McClelland, Maier & Neustadt, L.L.P.

(57) ABSTRACT

An image processing apparatus includes: an imaging unit configured to take an image of an area including an object on which an image is projected and to acquire image data; a distance measuring unit configured to calculate distance data relevant to a distance between the object and the imaging unit based on the image data; a plane estimating unit configured to estimate a plane corresponding to the object based on the distance data; and a correction information calculating unit configured to calculate correction information relevant to correction of an image to be projected based on the distance data and plane information relevant to the plane.

9 Claims, 20 Drawing Sheets

IMAGE PROCESSING APPARATUS 100

(51) Int. Cl.
*G08G 1/16* (2006.01)
*G03B 17/54* (2006.01)
*G03B 21/53* (2006.01)

(52) U.S. Cl.
CPC ........... *H04N 9/3194* (2013.01); *G03B 17/54* (2013.01); *G03B 21/53* (2013.01)

(58) Field of Classification Search
USPC ......................................................... 348/140
See application file for complete search history.

(56) References Cited

U.S. PATENT DOCUMENTS

| | | | | |
|---|---|---|---|---|
| 2005/0179875 | A1* | 8/2005 | Aoyanagi | G03B 21/14 353/101 |
| 2006/0158623 | A1* | 7/2006 | Kobayashi | G03B 21/00 353/122 |
| 2010/0053569 | A1* | 3/2010 | Furui | H04N 9/3194 353/70 |
| 2011/0150286 | A1 | 6/2011 | Ishigami et al. | |
| 2012/0320220 | A1 | 12/2012 | Hasegawa | |

FOREIGN PATENT DOCUMENTS

| | | |
|---|---|---|
| JP | 2005-092820 | 4/2005 |
| JP | 2005-229415 | 8/2005 |
| JP | 2006-197443 | 7/2006 |
| JP | 2006-304100 A | 11/2006 |
| JP | 2007-094036 | 4/2007 |
| JP | 2010-50540 A | 3/2010 |
| JP | 2011-133273 A | 7/2011 |
| WO | 2013/005857 A1 | 1/2013 |

OTHER PUBLICATIONS

Extended European Search Report issued Aug. 8, 2014 in Patent Application No. 12823869.8.
International Search Report Issued Oct. 30, 2012 in PCT/JP2012/070784 Filed on Aug. 9, 2012.

* cited by examiner

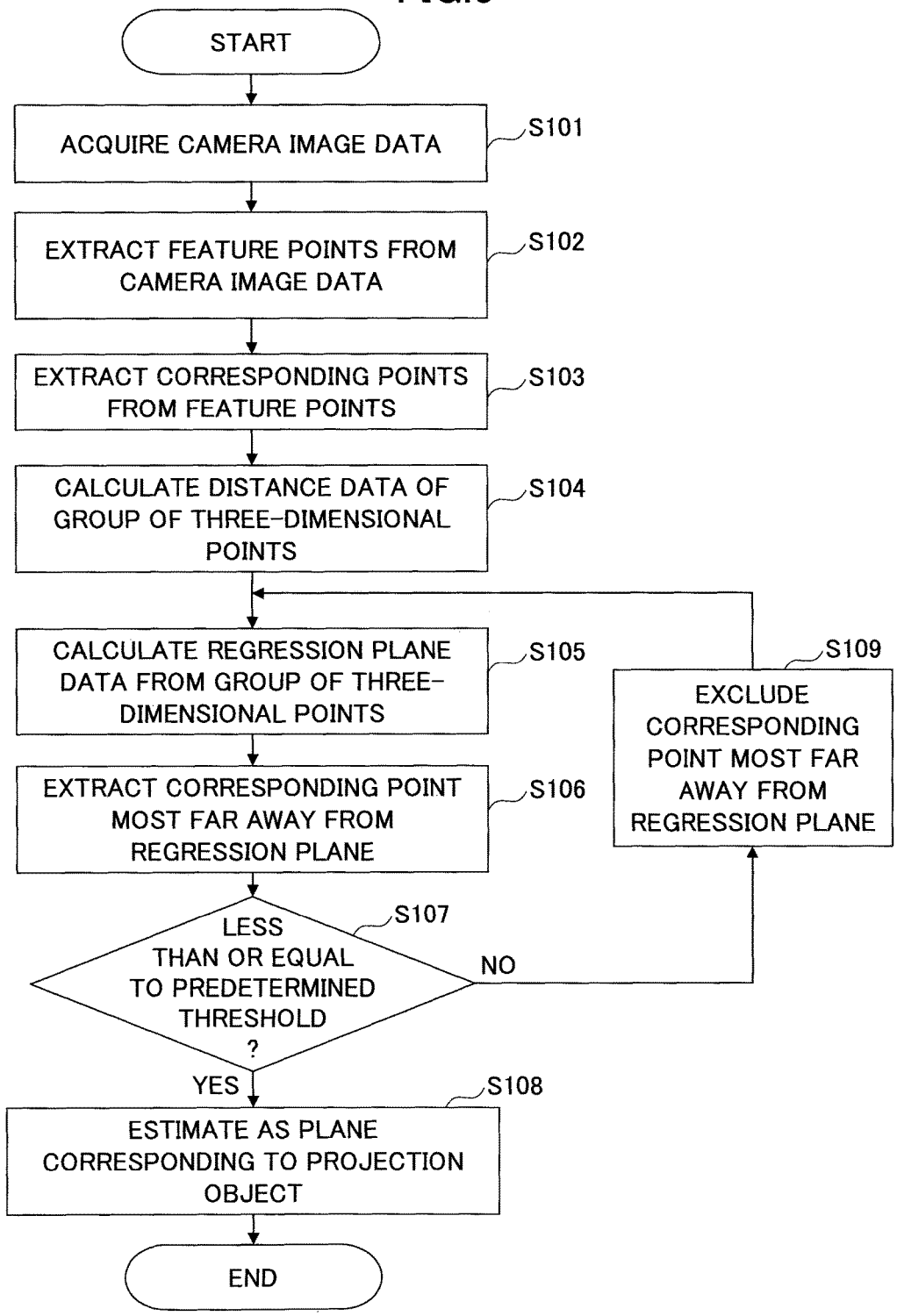

FIG.13A
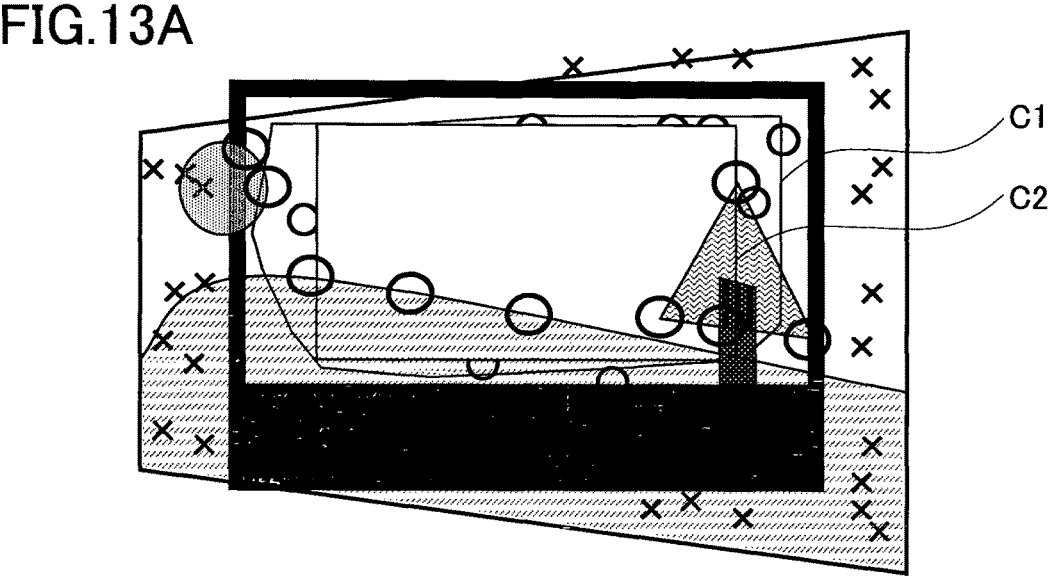
FIG.13B
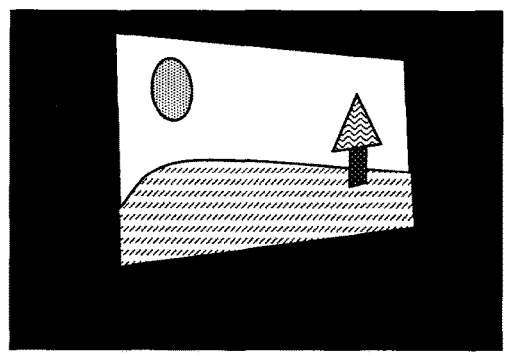
FIG.13C
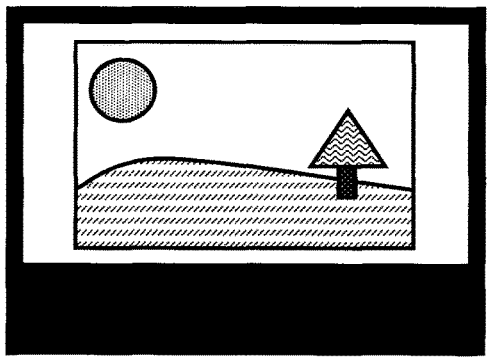

PRJr(400)

PROJECTOR SYSTEM 500

IMAGE PROCESSING APPARATUS, PROJECTOR AND PROJECTOR SYSTEM INCLUDING IMAGE PROCESSING APPARATUS, IMAGE PROCESSING METHOD

TECHNICAL FIELD

The present invention relates to an image processing apparatus, a projector and a projector system including the image processing apparatus, and an image processing method.

BACKGROUND ART

A projector is a device for projecting an image onto an object such as a screen. When projecting an image, the projected image may become distorted into a trapezoidal shape depending on the tilt angle of the projector and the object. In order to resolve the trapezoidal distortion of the projected image, there are projectors provided with an image processing apparatus for correcting (deforming) the image to be projected in advance.

There are image processing apparatuses for correcting the image to be projected based on the distance between the projector and the object as well as the tilt angle of the projector and the object.

Patent document 1 discloses a technology of projecting plural object points forming a predetermined pattern onto a surface of a projection object, and detecting the boundary between the projection object and the background (contour of projection object) based on the distance to the object points, and correcting the projection image (image to be projected) to correspond to the boundary.

When projecting images with a projector, in many cases, images are continuously projected for a predetermined time period. If the object or the projector is moved while projecting the images, the projector measures the distance and the tilt angle again to correct the projected images.

With the technology disclosed in patent document 1, trapezoidal correction of the projected image can be performed based on the distance to the object. However, in order to measure the distance, there are cases where it is necessary to interrupt the projection of the images by the projector, and project a predetermined pattern again.

Patent Document 1: Japanese Laid-Open Patent Publication No. 2005-229415

DISCLOSURE OF INVENTION

The present invention has been made in view of the above-described problems, and it is an object of at least one embodiment of the present invention to provide an image processing apparatus, a projector and a projector system including the image processing apparatus, and an image processing method, with which projected images can be corrected without interrupting the operation of projecting images, in a case where the positional relationship between the object and the projector changes while projecting images.

According to an aspect of the present invention, there is provided an image processing apparatus including an imaging unit configured to take an image of an area including an object on which an image is projected and acquire image data; a distance measuring unit configured to calculate distance data relevant to a distance between the object and the imaging unit based on the image data; a plane estimating unit configured to estimate a plane corresponding to the object based on the distance data; and a correction information calculating unit configured to calculate correction information relevant to correction of an image to be projected based on the distance data and plane information relevant to the plane.

According to an aspect of the present invention, there is provided an image processing method including taking, by an imaging unit, an image of an area including an object on which an image is projected, and acquiring image data; calculating distance data relevant to a distance between the object and the imaging unit based on the image data; estimating a plane corresponding to the object based on the distance data; and calculating correction information relevant to correction of an image to be projected based on the distance data and plane information relevant to the plane.

BRIEF DESCRIPTION OF DRAWINGS

FIG. 3 is a flowchart of an example of an operation of estimating a plane;

FIGS. 13A through 13C illustrate correction of an image to be projected according to the first embodiment;

BEST MODE FOR CARRYING OUT THE INVENTION

A description is given, with reference to the accompanying drawings, of embodiments of the present invention.

Embodiments of the present invention are described by an image processing apparatus for calculating information relevant to correcting projected images by performing image processing on an image obtained by taking an image of an area including the object.

Configuration of Image Processing Apparatus

Figure 1:
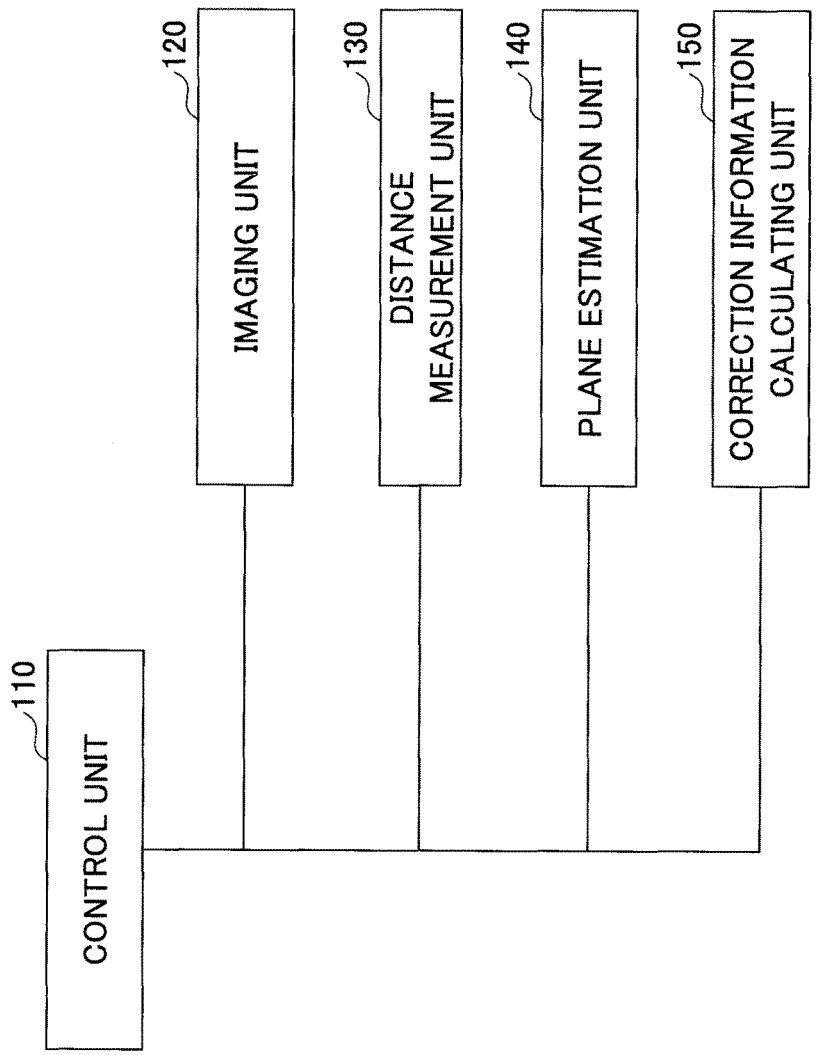
FIG. 1 is a schematic diagram of an example of an image processing apparatus.

FIG. 1 is a schematic diagram of an example of an image processing apparatus.

In FIG. 1, an image processing apparatus 100 includes a control unit 110, an imaging unit 120, a distance measurement unit 130, a plane estimation unit 140, and a correction information calculating unit 150.

The image processing apparatus 100 acquires, by the imaging unit 120, image data by taking an image of an area including an object (hereinafter, "projection object") on which the image is projected. The image processing apparatus 100 calculates, by the distance measurement unit 130, distance data relevant to a distance between the imaging unit 120 and the projection object. Furthermore, the image processing apparatus 100 estimates, by the plane estimation unit 140, a plane corresponding to the projection object, and calculates information relevant to correction of the image to be corrected (image processing such as magnification and reduction, hereinafter, "correction") based on information relevant to the estimated plane and the calculated distance data.

As the projection object, an object on which images can be projected on the external surface is used, such as a screen, a wall, and a white board.

The control unit 110 is for controlling the entire image processing apparatus 100. The control unit 110 controls the imaging unit 120, etc., based on information input from outside. Furthermore, the control unit 110 controls output of information relevant to results of image processing by the image processing apparatus 100, based on information input from outside.

The imaging unit 120 focuses an image of an area including the projection target on an imaging sensor, and acquires image data relevant to the image from pixel output signals (electric signals) of the image sensor. In the present embodiment, the imaging unit 120 includes a stereo camera and an imaging image generation unit.

The stereo camera includes two imaging lenses and two imaging sensors, and simultaneously photographs two images of the projection object with the two imaging lenses. The imaging lens is for inputting an image of the projection object in the imaging sensors. The imaging sensor has a light receiving surface on which plural light receiving elements are arranged in a lattice. The imaging sensor focuses the image input through the imaging lens on its light receiving surface.

The imaging image generation unit generates image data relevant to an image of an area including the projection target, based on the pixel output signals of the imaging sensor.

The distance measurement unit 130 is for measuring the distance between the image processing apparatus 100 (imaging unit 120) and the projection object. The distance measurement unit 130 calculates the distance from the image processing apparatus 100 (imaging unit 120) to the projection object by the principle of triangulation, based on the two sets of image data acquired by the imaging unit 120. Details are given below (operation of measuring distance).

The plane estimation unit 140 recursively approximates a plane corresponding to the projection object based on the distance data calculated by the distance measurement unit 130. Here, recursively approximating a plane means to approximately estimate a plane based on plural positions, and then excluding the positions that are away from the estimated plane by predetermined distances and estimating the plane again (regression analysis). Details are given below (operation of estimating plane).

The correction information calculating unit 150 calculates information relevant to correction of the image to be projected, based on information relevant to the plane estimated by the plane estimation unit 140. Details are given below (operation of calculating correction information).

In the following description, as the data relevant to the image, the "contents image data Aimg" is image data relevant to an image input from a PC to a projecting means (e.g., projector).

"Camera image data Cimg" is image data relevant to an image obtained by the imaging unit 120 by taking an image of the projected contents image data Aimg. The camera image data Cimg is generated by performing digital processing on electric signals (pixel output signals) indicating the brightness of received light by the light receiving elements of the imaging unit 120.

"Virtual image data Vimg" is image data relevant to the camera image data Cimg, in which it is assumed that the image is taken from a normal line direction (hereinafter, "front direction") of the external surface (surface on which image is projected) of the projection object. The virtual image data Vimg is generated with the use of a perspective projection conversion matrix P described below, based on information relevant to a normal line vector calculated by the correction information calculating unit 150.

"Projector image data Pimg" is image data obtained by correcting the contents image data Aimg, for resolving the trapezoidal distortion of the virtual image data Vimg. The projector image data Pimg is generated with the use of a trapezoidal correction conversion matrix Hpp described below, based on information relevant to correction calculated by the correction information calculating unit 150.

Functions of Image Processing Apparatus

Figure 2:
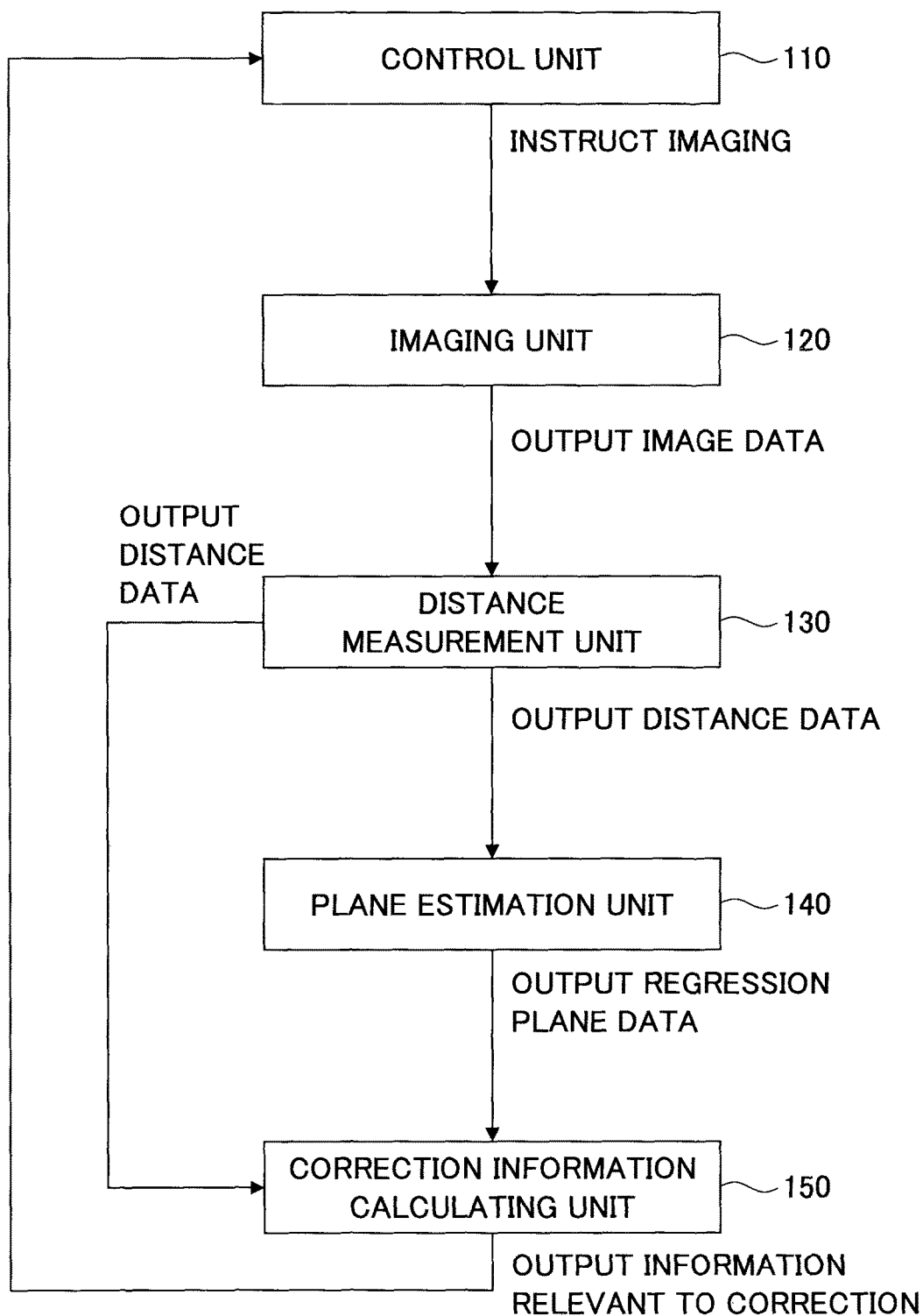
FIG. 2 is a functional block diagram of the image processing apparatus.

An example of functions of the image processing apparatus is described with reference to FIG. 2. FIG. 2 is a functional block diagram of the image processing apparatus.

As indicated in FIG. 2, the control unit 110 outputs signals instructing to start imaging to the imaging unit 120, to start operations of image processing.

The imaging unit 120 takes an image of an area including the projection target with a stereo camera to acquire two sets of camera image data Cimg. The imaging unit 120 outputs the acquired camera image data Cimg to the distance measurement unit 130.

The distance measurement unit 130 calculates the distance data corresponding to plural positions on the external surface of the projection object (hereinafter, "corresponding points"), based on the two sets of camera image data Cimg. Furthermore, the distance measurement unit 130 outputs the distance data to the plane estimation unit 140 and the correction information calculating unit 150. The distance data is data relevant to the distance from the image processing apparatus 100 to the projection object (corresponding points). Details of the method of measuring the distance are given below (operation of measuring distance).

The plane estimation unit 140 calculates regression plane data as the plane corresponding to the projection target, from the distance data calculated by the distance measurement unit 130. The plane estimation unit 140 outputs the regression plane data to the correction information calculating unit 150. The regression plane data is data relevant to the plane including plural positions in a three-dimensional space. Details of the estimation method are given below (operation of estimating plane).

The correction information calculating unit 150 calculates information relevant to correcting the contents image data Aimg, based on the distance data of the distance measurement unit 130 and the regression plane data of the plane estimation unit 140. Specifically, the correction information calculating unit 150 calculates convex hull data C1 (FIG. 8B) described below, based on the distance data and the regression plane data. Furthermore, the correction information calculating unit 150 calculates a trapezoid correction conversion matrix (hereinafter, "information relevant to correction") necessary for correcting the contents image data Aimg, to cancel (resolve) the trapezoidal distortion of the virtual image data Vimg based on the convex hull data C1. Details of the calculation method are given below (operation of calculating correction information).

The correction information calculating unit 150 outputs information relevant to correction on the projecting means (not shown) by the control unit 110.

Operation of Measuring Distance

A description is given of an operation performed by the distance measurement unit 130, of calculating distance data relevant to the distance from the imaging unit 120 (image processing apparatus 100) to the corresponding points (projection object), with the use of a stereo camera of the imaging unit 120.

The stereo camera includes a first camera (standard camera) and a second camera (reference camera). The first camera and the second camera include a first imaging lens and a second imaging lens, and a first imaging sensor and a second imaging sensor located in the back direction (direction opposite to the direction toward the projection object) of the first imaging lens and the second imaging lens. As the imaging sensor, an area sensor, a surface sensor, and a two-dimensional sensor may be used.

The first imaging lens and the second imaging lens are disposed in parallel with a predetermined interval D (hereinafter, "base length"), and the light axis of the first imaging lens and the light axis of the second imaging lens are parallel to each other. Furthermore, the first imaging sensor has a light receiving surface on which an image of an object is focused, on the surface on the front side (opposite to the back side). The light axis of the first imaging lens is positioned so as to match the center of the diagonal lines of the light receiving surface of the first imaging sensor.

A first image of a projection object input through the first imaging lens and a second image of a projection object input through the second imaging lens are focused on the respective light receiving units by being displaced by a disparity $\Delta$. The imaging sensors perform photoelectric conversion to convert the brightness caused by light of the first image and the second image into pixel output signals, and output the pixel output signals to the distance measurement unit 130. At this time, the distance measurement unit 130 compares the pixel output signals, and detects a disparity $\Delta$ from the positions (coordinates) of the light receiving elements (pixels) on the light receiving surface. The following formula 1 is established (principle of triangulation) based on the disparity $\Delta$, the base length D, the distance L between the image processing apparatus 100 and the projection object, and the focal length f between the imaging lenses, on condition of L>f.

$$L = D \cdot f / \Delta \qquad \text{Formula 1}$$

In this case, D and f are known values.

The distance measurement unit 130 calculates the distance L with formula 1 based on the detected disparity $\Delta$.

Next, a detailed description is given of the operation performed by the distance measurement unit 130 of calculating the absolute coordinates (XYZ coordinates) of the corresponding points. It is assumed that the X axis is the direction of the base length D, the Y axis is the direction along the light receiving surface of the imaging sensor orthogonal with the X axis, and the Z axis is the direction orthogonal to the X axis and the Y axis (direction of light axis of stereo camera). Furthermore, the relative coordinates (xyz coordinates) with respect to the light receiving surfaces of the first camera (index r) and the second camera (index 1) are expressed by formula 2.

$$m_r = (x_r, y_r), \; m_l = (x_l, y_l) \qquad \text{Formula 2}$$

In this case, the disparity is expressed by formula 3.

$$\Delta = x_{l\Delta} - x_{r\Delta} \qquad \text{Formula 3}$$

Next, the coordinates P (absolute coordinates) of the corresponding points are expressed by formula 4.

$$P = (X, Y, Z) \qquad \text{Formula 4}$$

In this case, the coordinates P of the corresponding points are expressed by formula 5, according to formulas 1 through 3.

$$Z = \frac{D \cdot f}{x_{l\Delta} - x_{r\Delta}}, \quad X = \frac{Z}{f} x_{r\Delta}, \quad Y = \frac{Z}{f} y_{r\Delta} \qquad \text{Formula 5}$$

As described above, the distance measurement unit 130 calculates the three-dimensional coordinates (absolute coordinates) of the corresponding points on the external surface of the projection object with the use of the stereo camera of the imaging unit 120, and acquires the calculated three-dimensional coordinates as distance data relevant to the corresponding points.

Operation of Estimating Plane

Figure 4A:
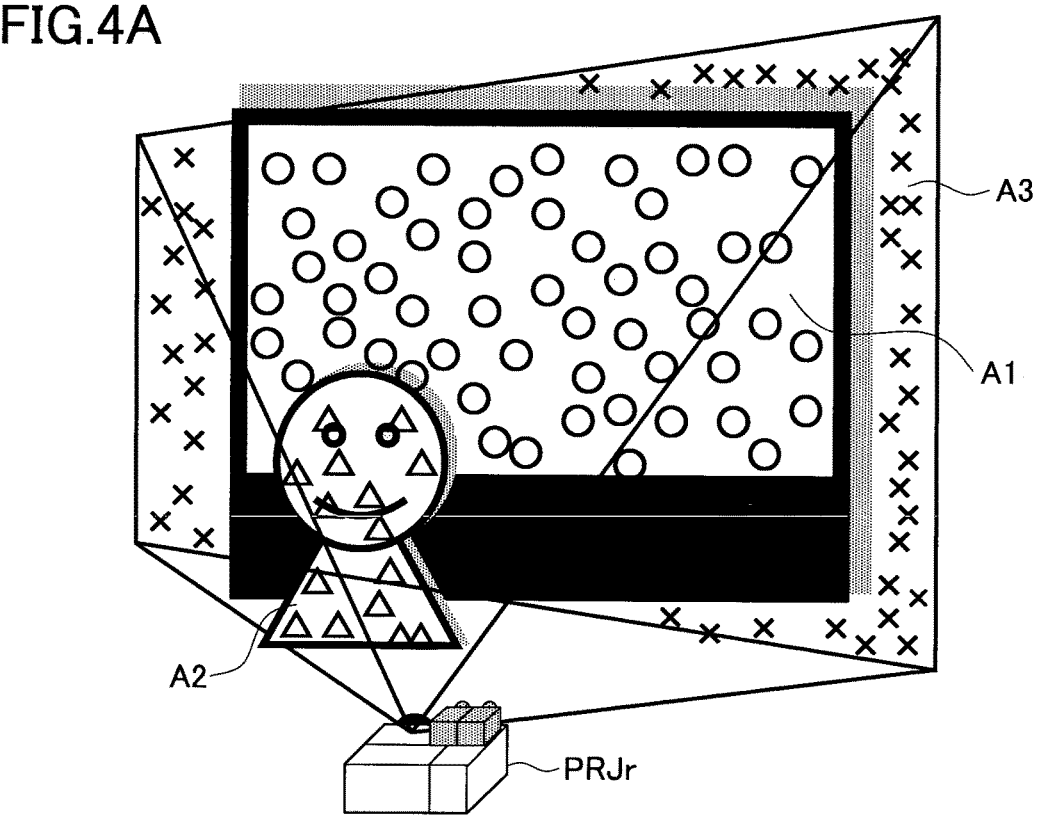
FIGS. 4A and 4B illustrate an operation of taking an image of a projection object.
Figure 4B:
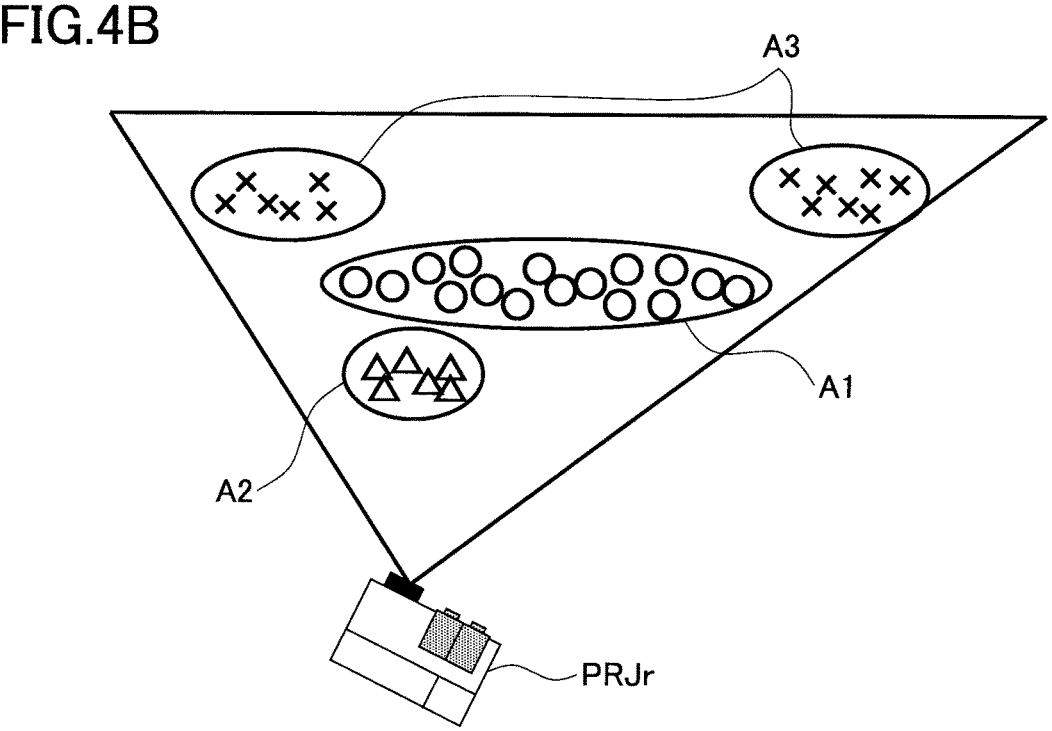
Figure 5A:
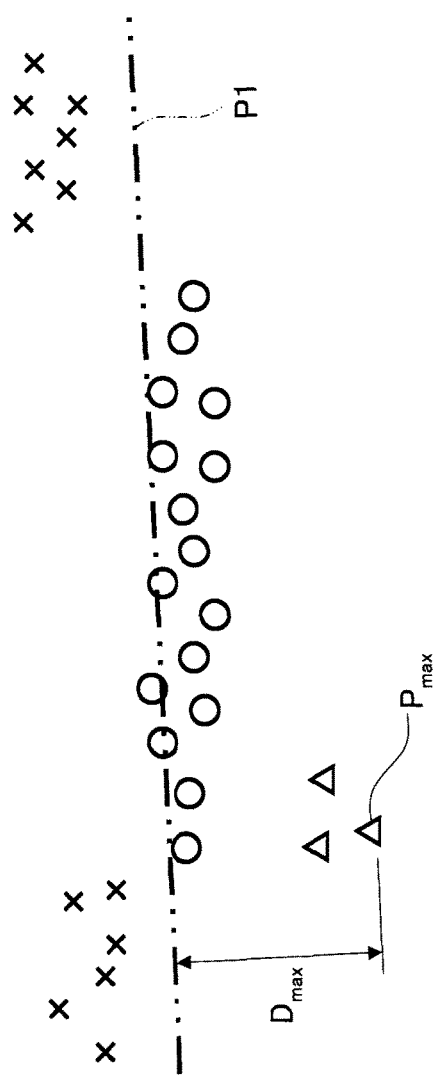
FIGS. 5A and 5B illustrate a method of estimating a plane.

A description is given of the operation of estimating a plane corresponding to the projection object performed by the plane estimation unit 140, with reference to FIGS. 3 through 5A. FIG. 3 is a flowchart of an example of an operation of estimating a plane performed by the plane estimation unit 140. FIGS. 4A and 4B illustrate an example of an operation of taking an image of the projection object performed by the imaging unit 120. FIGS. 5A and 5B illustrate a method of estimating a plane by regression analysis.

In FIG. 3, the imaging unit 120 takes an image of an area including the projection object, and acquires camera image data Cimg (step S101). The operation of taking an image performed by the imaging unit 120 is described in detail with reference to FIGS. 4A and 4B.

FIGS. 4A and 4B illustrate the operation of taking an image of the projection object. FIG. 4A illustrates a view from the front of the projection object on which the image is projected. FIG. 4B illustrates a view from the top in the vertical direction of the projection object on which the image is projected. The circles ○ in FIGS. 4A and 4B indicate the positions (feature points) of the surface of a projection object (screen) A1. The triangles △ in FIGS. 4A and 4B indicate the positions (feature points) of a presenter A2. The crosses X in FIGS. 4A and 4B indicate the positions (feature points) of a wall A3 behind the projection object.

In FIGS. 4A and 4B, the presenter A2 is standing in front of the projection object A1. The wall A3 is near the back of the projection object A1 (opposite to the front). The imaging unit 120 provided in the projector takes an image of an area including the projection object A1 on which the contents image data Aimg is projected by a projector (projecting means), and acquires camera image data Cimg.

In step S101 of FIG. 3, when the camera image data Cimg is acquired, the imaging unit 120 outputs the camera image data Cimg to the distance measurement unit 130. Subsequently, the process proceeds to step S102.

In step S102, the distance measurement unit 130 extracts feature points (◯, Δ, ☐ in FIGS. 4A and 4B) in the area including the projection target, based on the camera image data Cimg output from the imaging unit 120. The operation of extracting feature points performed by the distance measurement unit 130 is described in detail below.

First, the distance measurement unit 130 selects an arbitrary pixel as a selection point, for one of the two sets of camera image data Cimg acquired by the stereo camera (hereinafter, "imaging data A"). Next, the distance measurement unit 130 compares the image information (color, brightness, edge strength, etc.) of the selection point with that of eight pixels around the selection point based on the imaging data A. At this time, when the image information of the selection point is greater than or less than all of the image information items of the surrounding eight pixels, the selection point is extracted as a feature point $(x_A, y_A)$. Furthermore, the distance measurement unit 130 extracts an area of 15 pixels by 15 pixels centering around the feature point as a template block A.

When extraction of the feature points is completed, the process proceeds to step S103.

The method of extracting the feature points is not limited to the above. As long as a point having a feature on the surface of the projection object can be extracted, any method may be used. Furthermore, specific examples of the feature point are described below in the first and second embodiments.

In step S103, the distance measurement unit 130 extracts corresponding points based on the feature points extracted at step S102. The operation of extracting the corresponding points performed by the distance measurement unit 130 is described in detail below.

The distance measurement unit 130 selects an arbitrary pixel as a selection point $(x_B, y_B)$, for the other one of the two sets of camera image data Cimg acquired by the stereo camera (hereinafter, "imaging data B"). The distance measurement unit 130 selects an area of 15 pixels by 15 pixels centering around the selection point as a template block B. Next, the distance measurement unit 130 calculates the total sum of image information in the template block A and the total sum of image information in the template block B, and compares the two total sums of image information. The comparison method may be SAD (Sum of Absolute Distance) and SSD (Squared Sum of Differences), for example.

SAD is a method of obtaining the total sum of differences of absolute values when comparing the total sums. SSD is a method of obtaining the squared sum of differences.

Next, the distance measurement unit 130 selects a selection point $(x_B, y_B)$ in the template block B having the minimum difference of total sums in the image information, as a result of comparing the template block A and the template block B. At this time, when the difference is less than a predetermined value, the feature point $(x_A, y_A)$ of the imaging data A and the selection point $(x_B, y_B)$ of the imaging data B are associated with each other, and the ((feature point $(x_A, y_A)$, selection point $(x_B, y_B)$) are extracted as the corresponding point $(x_{AB}, y_{AB})$.

The predetermined value may be the distance between the projection object and the image processing apparatus, or a value corresponding to the depth of field. Furthermore, the predetermined value may be a value determined by numerical calculations or experiments.

In extracting the corresponding points, the distance measurement unit 130 compares all of the feature points extracted from the imaging data A with the selection point of the imaging data B. At this time, the distance measurement unit 130 extracts plural corresponding points (hereinafter, "group of three-dimensional points").

When the extraction of corresponding points is completed, the process proceeds to step S104.

In step S104, the distance measurement unit 130 calculates distance data relevant to the distances of the group of three-dimensional points extracted at step S103. The operation of calculating the distance data is the same as the operation of measuring the distance, and is thus not further described.

When the calculation of distance data is completed, the process proceeds to step S105.

In step S105, the distance measurement unit 130 calculates regression plane data as information of a plane corresponding to the projection object, based on the distance data calculated by the distance measurement unit 130. The method of calculating regression plane data is described in detail with reference to FIGS. 5A and 5B.

Figure 5B:
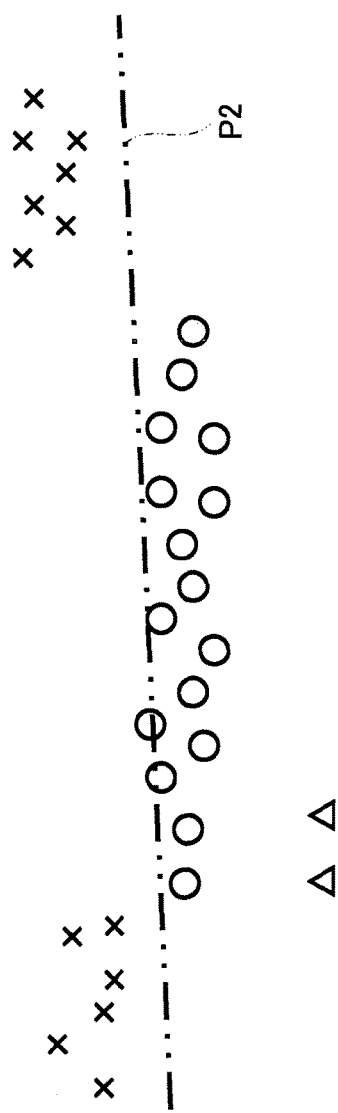

FIG. 5A indicates a regression plane P1 after performing regression analysis. FIG. 5B indicates a regression plane P2 after excluding corresponding points that are most far away from the plane estimated at step S109 described below.

In FIG. 5A, by steps S102 through S104, an n number of corresponding points $(X_{ABi}, Y_{ABi}, Z_{ABi})$ through n) are calculated as the group of three-dimensional points (◯, Δ, and X in FIGS. 5A and 5B).

The plane estimation unit 140 calculates a regression plane from the group of three-dimensional points by regression analysis, and therefore the equation of the regression plane is defined as $z=ax+by+c$. The regression plane and the group of three-dimensional points are expressed by formula 6.

$$Z = X\beta + \epsilon \qquad \text{Formula 6}$$

The variable of formula 6 is expressed by formula 7.

$$Z = \begin{pmatrix} z_{AB1} \\ z_{AB2} \\ \vdots \\ z_{ABn} \end{pmatrix}, X = \begin{pmatrix} x_{AB1} & y_{AB1} & 1 \\ x_{AB2} & y_{AB2} & 1 \\ & \vdots & \\ x_{ABn} & y_{ABn} & 1 \end{pmatrix}, \beta = \begin{pmatrix} a \\ b \\ c \end{pmatrix}, \varepsilon = \begin{pmatrix} e_1 \\ e_2 \\ \vdots \\ e_n \end{pmatrix} \qquad \text{Formula 7}$$

In formula 7, $e_i$ expresses the residual error.
Next, the normal equation is formula 8.

$$X^T Z = (X^T X)\beta \qquad \text{Formula 8}$$

Accordingly, $\beta$ is expressed by formula 9.

$$\beta = (X^T X)^{-1} X^T Z \qquad \text{Formula 9}$$

As described above, by calculating the parameters a, b, and c at which the square sum of the residual error $e_i$ is minimum, regression planes (P1 and P2 in FIGS. 5A and 5B) can be obtained. The plane estimation unit 140 acquires parameters a, b, and c of the equation of the regression plane ($z=ax+by+c$) as regression plane data. When the regression plane data is acquired, the process proceeds to step S106.

Next, in step S106 of FIG. 3, the distances $D_{ABi}$ between the regression plane and the group of three-dimensional points are calculated, and the corresponding point $P_{MAX}$ ($X_{ABD}$, $Y_{ABD}$, $Z_{ABD}$) in the group of three-dimensional points that is most far away from the regression plane and the distance $D_{MAX}$ of this corresponding point is extracted ($P_{MAX}$ in FIG. 5A). Specifically, the distance from the corresponding point ($X_{ABi}$, $Y_{ABi}$, $Z_{ABi}$) to the plane ($\alpha x + \beta y + \gamma z + \delta = 0$) is calculated by formula 10.

$$D_{ABi} = \frac{|\alpha x_{ABi} + \beta y_{ABi} + \gamma z_{ABi} + \delta|}{\sqrt{\alpha^2 + \beta^2 + \gamma^2}} \quad \text{Formula 10}$$

The distances between the regression plane and all of the three-dimensional points are calculated, and a corresponding point at which the absolute value of the distance is maximum is selected. When the extraction of the corresponding point $P_{MAX}$ ($X_{ABD}$, $Y_{ABD}$, $Z_{ABD}$) that is most far away is completed, the process proceeds to step S107.

In step S107, the distance $D_{MAX}$ relevant to the corresponding point $P_{MAX}$ ($X_{ABD}$, $Y_{ABD}$, $Z_{ABD}$) is compared with a predetermined distance. When the distance $D_{MAX}$ is less than or equal to the predetermined distance, the process proceeds to step S108. When the distance $D_{MAX}$ is greater than the predetermined distance, the process proceeds to step S109.

A predetermined distance may be a value corresponding to the distance between the projection object and the image processing apparatus, and the predetermined distance may be determined by numerical calculations or experiments. Furthermore, the predetermined distance may be a value corresponding to the depth of field.

In step S108, the calculated regression plane (step S105) is estimated as a plane corresponding to the projection object, and is stored as regression plane data. Subsequently, the process proceeds to END in FIG. 3, and the estimation of the plane ends.

In step S109, the corresponding point $P_{MAX}$ ($X_{ABD}$, $Y_{ABD}$, $Z_{ABD}$) is excluded from the group of three-dimensional points. When the exclusion is completed, the process returns to step S105, and steps S105 through S107 are repeated, and the regression plane P2 is estimated again (FIG. 5B).

As described above, the image processing apparatus according to an embodiment of the present invention measures the distance from the image processing apparatus to the projection object, and can estimate a plane corresponding to the projection object by performing regression analysis. Furthermore, the image processing apparatus according to an embodiment of the present invention excludes corresponding points at which the distance from the plane exceeds a predetermined distance, and therefore when there is an obstacle between the image processing apparatus and the projection object, or when a wall behind the projection object is near the projection object, it is possible to estimate the plane corresponding to the projection object.

Furthermore, in the operation of estimating the plane, the corresponding points to be excluded are not limited to those relevant to an obstacle or a background wall, and may include anything other than the projection object. Furthermore, the group of three-dimensional points used for estimating the plane may be obtained by calculating parameters of a plane constituted by "plural points randomly selected" and points other than the "plural points randomly selected" from the group of three-dimensional points extracted at the operation of measuring the distance, and using points whose parameters have small differences.

Operation of Calculating Correction Information

A description is given of the operation of calculating correction information performed by the correction information calculating unit 150, with reference to FIGS. 6 through 9B.

Figure 6:
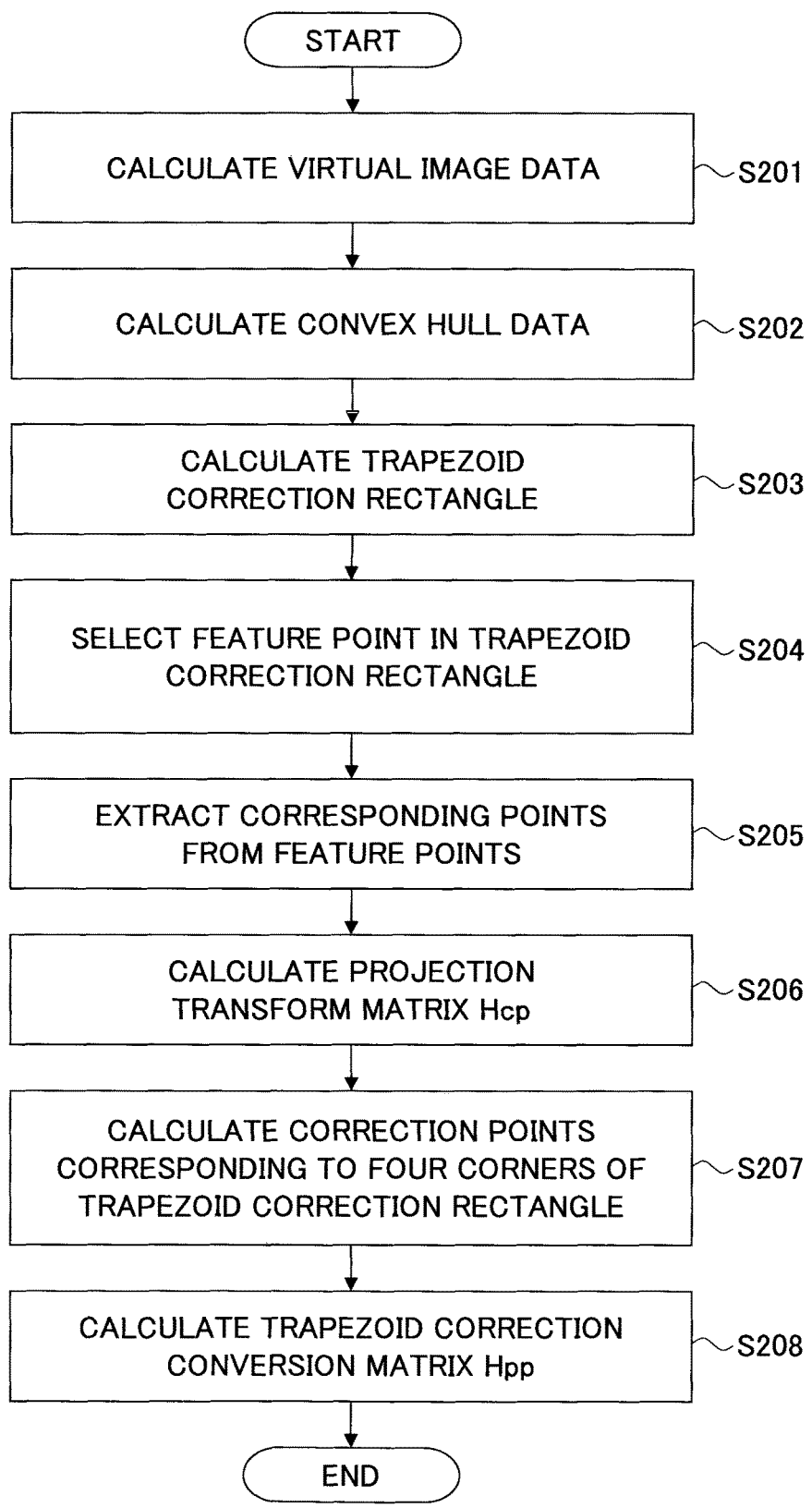
FIG. 6 is a flowchart of an example of an operation of calculating correction information.
Figure 7:
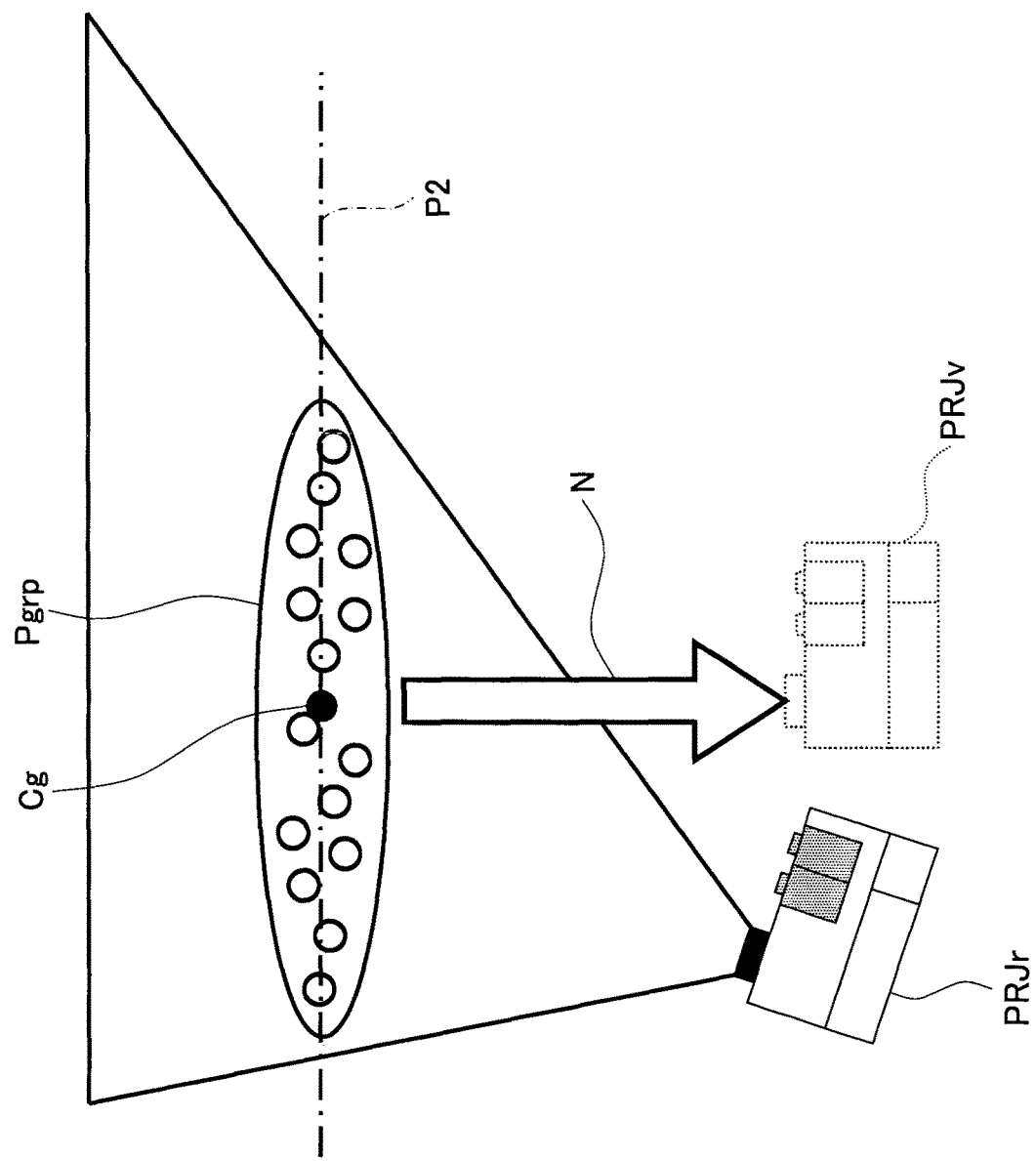
FIG. 7 illustrates an operation of acquiring virtual image data from a virtual camera.
Figure 8A:
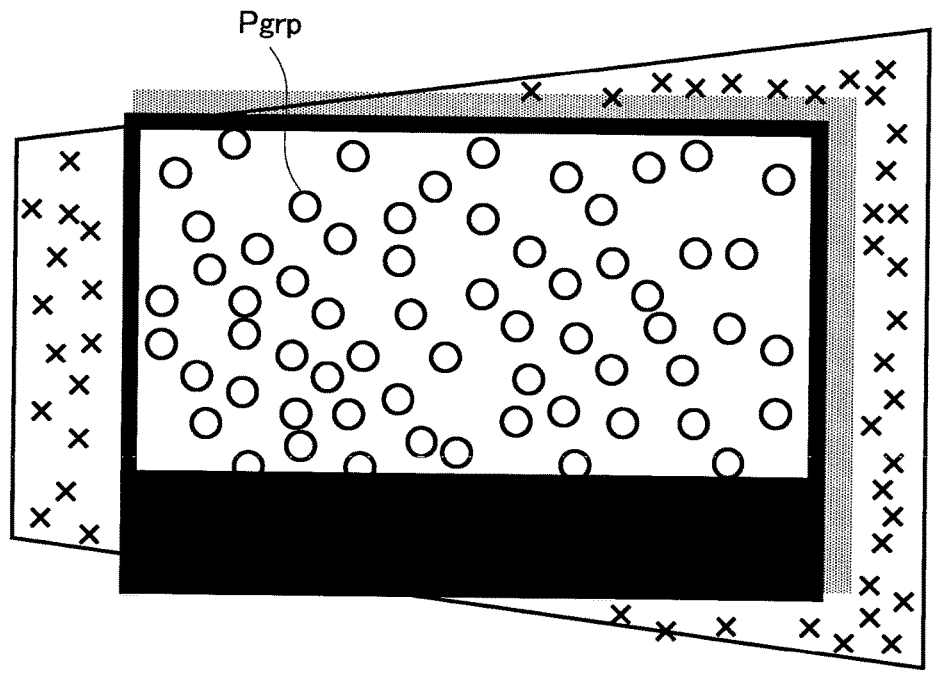
FIGS. 8A and 8B illustrate virtual image data.
Figure 8B:
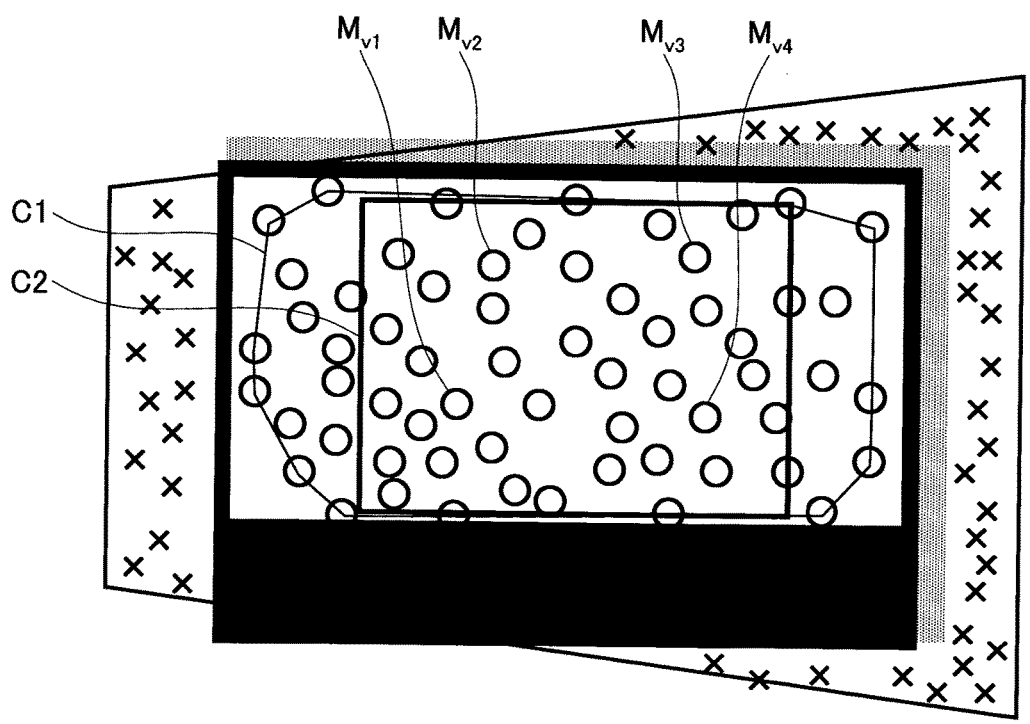
Figure 9A:
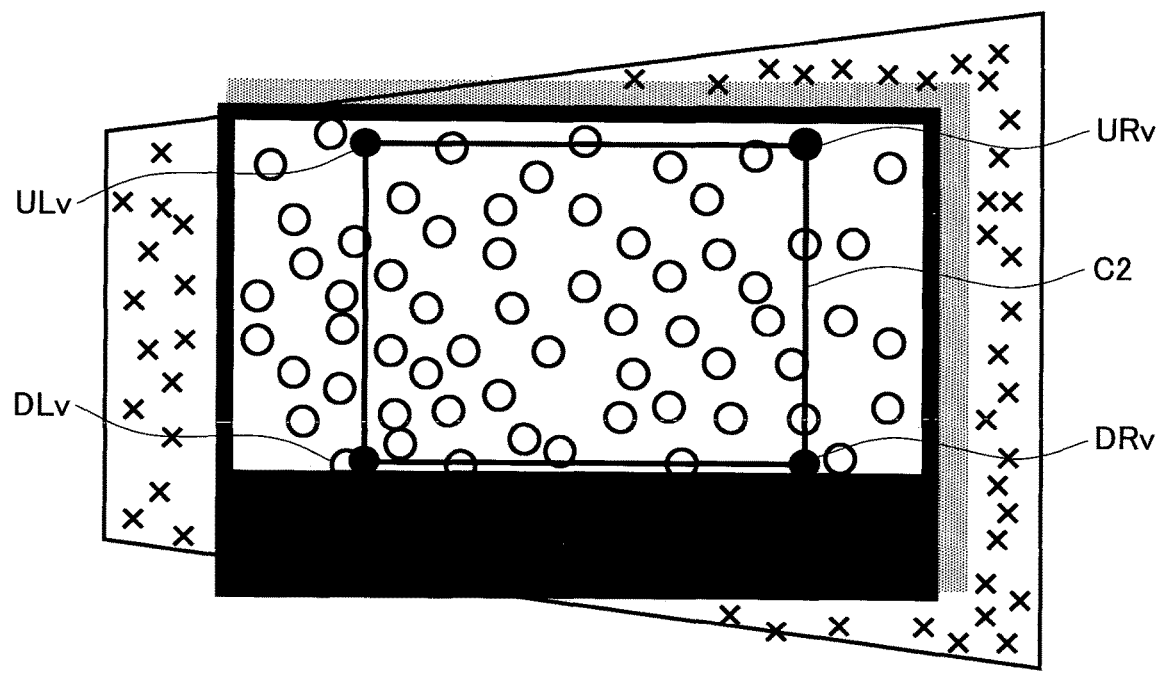
FIGS. 9A and 9B illustrate the calculation of a trapezoidal correction conversion matrix.
Figure 9B:
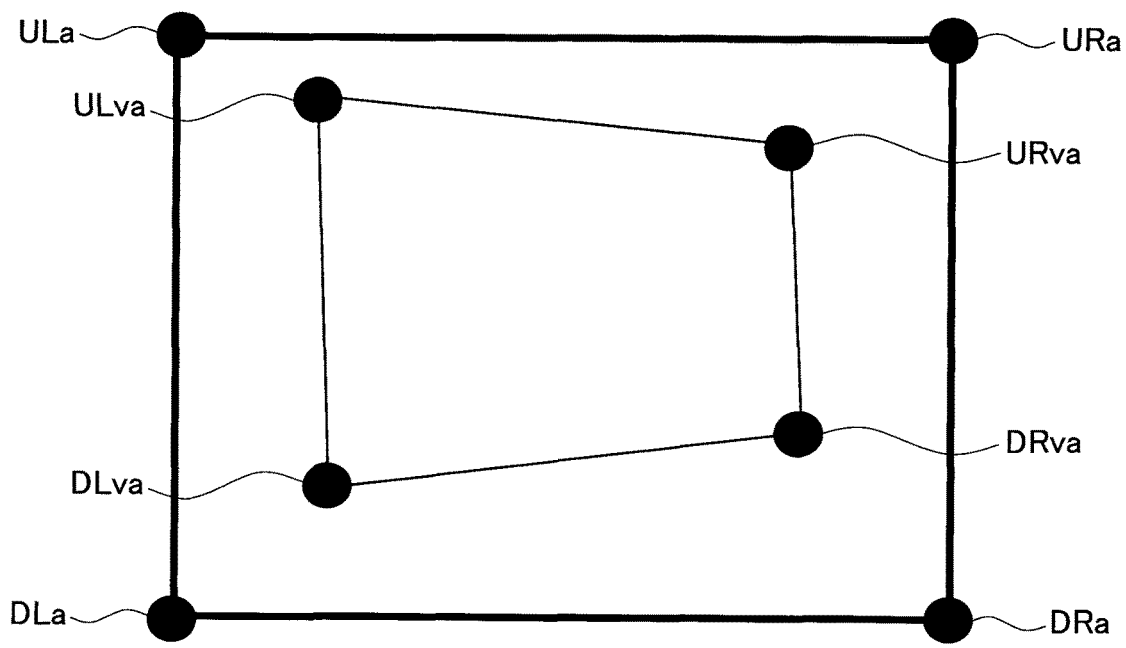

FIG. 6 is a flowchart of an example of an operation of calculating correction information. FIG. 7 illustrates an operation of acquiring virtual image data from a virtual camera. FIGS. 8A and 8B illustrate virtual image data. FIGS. 9A and 9B illustrate the calculation of a trapezoidal correction conversion matrix.

In FIG. 6, the correction information calculating unit 150 calculates image data (virtual image data Vimg) relevant to the camera image data Cimg, when it is assumed that an image of the plane estimated by the plane estimation unit 140 is taken from the front direction (step S201). The operation of calculating the virtual image data Vimg performed by the correction information calculating unit 150 is described in detail with reference to FIG. 7.

In FIG. 7, it is assumed that a virtual camera (a projector including an imaging unit) PRJv is positioned on a line extended from the normal direction N of the plane of a center (centroid) position Cg of the group of three-dimensional points Pgrp in the estimated plane.

In FIG. 7, an actual camera (a projector including an imaging unit) PRJr projects contents image data Aimg. At this time, in the actual camera PRJr, the imaging unit 120 acquires the camera image data Cimg, the distance measurement unit 130 acquires distance data of the group of three-dimensional points Pgrp, and the plane estimation unit 140 estimates the plane P2.

The correction information calculating unit 150 calculates the virtual image data Vimg taken by the virtual camera PRJv positioned along a line extended from the normal direction N of the plane P2. Specifically, the correction information calculating unit 150 uses a perspective projection conversion matrix P to project the group of three-dimensional points Pgrp onto a two-dimensional plane (a plane corresponding to the virtual image data Vimg taken by the virtual camera PRJv), and calculates the virtual image data Vimg.

The perspective projection conversion matrix P is expressed by formula 11, where the internal parameter is A, a rotation matrix that is an external parameter is R, and a parallel movement vector is t.

$$P = A(Rt) \quad \text{Formula 11}$$

Here, the internal parameter A is a matrix (3×3) defined with the use of the optical axis coordinates of the virtual camera PRJv, the scale of the rows and columns of the imaging sensor, and a focal distance f. The rotation matrix R is a matrix (3×3) indicating the rotation from the actual camera PRJr to the virtual camera PRJv. The parallel movement vector t is a vector (3×1) indicating the parallel movement from the actual camera PRJr to the virtual camera PRJv.

When the calculation of the virtual image data Vimg is completed, the process proceeds to step S202.

Next, in step S202 of FIG. 6, the distance measurement unit 130 calculates the convex hull data in the calculated virtual image data Vimg. Here, the convex hull data is data relevant to a polygon (hereinafter, "convex hull") encompassing plural corresponding points calculated by the distance measurement unit 130 on the plane estimated by the plane estimation unit 140 in the group of three-dimensional points. A method of calculating the convex hull data is described in detail with reference to FIGS. 8A and 8B.

FIGS. 8A and 8B illustrate virtual image data Vimg acquired by the virtual camera PRJv. FIG. 8A illustrates the corresponding points in the virtual image data Vimg. FIG. 8B illustrates convex hull data and a trapezoid correction rectangle described below.

In FIG. 8A, the correction information calculating unit 150 extracts plural corresponding points (○ in FIG. 8A, group of three-dimensional points Pgrp in FIG. 7) on a plane estimated by the plane estimation unit 140 from the virtual image data Vimg acquired by the virtual camera PRJv, based on the distance data calculated by the distance measurement unit 130. Next, in FIG. 8B, the correction information calculating unit 150 calculates the convex hull data relevant to the convex hull encompassing the extracted plural corresponding points. At this time, the convex hull is a polygon C1 including the ○ marks in FIG. 8B.

When the calculation of the convex hull data is completed, the process proceeds to step S203.

Next, in step S203 of FIG. 6, the correction information calculating unit 150 calculates a trapezoid correction rectangle in the virtual image data Vimg. The trapezoid correction rectangle is a rectangle having the maximum area encompassed by the convex hull C1 calculated at step S202. The correction information calculating unit 150 fixes the aspect ratio, and calculates a trapezoid correction rectangle C2 encompassed by the convex hull C1 (FIG. 8B). The aspect ratio may be the same as that of the image relevant to the projector image data Pimg. For example, when projecting an image of 1600×1200 pixels, the aspect ratio may be 4:3.

When the calculation of the trapezoid correction rectangle is completed, the process proceeds to step S204.

In step S204 of FIG. 6, the correction information calculating unit 150 selects, as feature points, arbitrary four points ($M_{V1}$ through $M_{V4}$ in FIG. 8B) in the trapezoid correction rectangle C2. The arbitrary four points may be points at the four corners of the projection light relevant to the virtual image data Vimg. In this case, even if an image with a small number of feature points (or an image from which feature points cannot be extracted) is projected, it is possible to extract the points at the four corners as feature points. When the selection of feature points is completed, the process proceeds to step S205.

In step S205, the correction information calculating unit 150 extracts corresponding points in the contents image data Aimg corresponding to feature points ($M_{V1}$ through $M_{V4}$). The operation of extracting the corresponding points is the same as the operation of measuring the distance, and is thus not further described. When the extraction of corresponding points is completed, the process proceeds to step S206.

In step S206, the correction information calculating unit 150 calculates a projection transform matrix Hcp. Specifically, assuming that the four corresponding points in an image relevant to the contents image data Aimg corresponding to the feature points $m_{Vi}$ ($x_{Vi}$, $y_{Vi}$) in the image relevant to the virtual image data Vimg are $m_{ai}=(x_{ai}, y_{ai})$ (i=1 through 4), a projection transform matrix Hcp and formula 12 are established.

$$\tilde{m}_{ai} \approx Hcp \cdot \tilde{m}_{vi} \quad \text{Formula 12}$$

The right side and the left side in formula 12 indicate that they are equal in a homogeneous coordinate system (equal other than the constant factors of all components). Furthermore, the projection transform matrix Hcp is expressed by the following formula.

$$Hcp = \begin{pmatrix} h_1 & h_2 & h_3 \\ h_4 & h_5 & h_6 \\ h_7 & h_8 & 1 \end{pmatrix} \quad \text{Formula 13}$$

At this time, formula 12 may be expressed as formula 14.

$$\begin{pmatrix} x_{ai} \\ y_{ai} \\ 1 \end{pmatrix} = \begin{pmatrix} h_1 & h_2 & h_3 \\ h_4 & h_5 & h_6 \\ h_7 & h_8 & 1 \end{pmatrix} \begin{pmatrix} x_{vi} \\ y_{vi} \\ 1 \end{pmatrix} = \begin{pmatrix} h_1 x_{vi} + h_2 y_{vi} + h_3 \\ h_4 x_{vi} + h_5 y_{vi} + h_6 \\ h_7 x_{vi} + h_8 y_{vi} + 1 \end{pmatrix} \quad \text{Formula 14}$$

When the right side is normalized for combining the three components of formula 14 into one, formula 15 is obtained.

$$x_{ai} = \frac{h_1 x_{vi} + h_2 y_{vi} + h_3}{h_7 x_{vi} + h_8 y_{vi} + 1}, \quad y_{ai} = \frac{h_4 x_{vi} + h_5 y_{vi} + h_6}{h_7 x_{vi} + h_8 y_{vi} + 1} \quad \text{Formula 15}$$

Here, $h_1$ through $h_8$ are unknown coefficients. By obtaining four combinations of corresponding points $M_{ai}$ ($x_{ai}$, $y_{ai}$) in the image relevant to the contents image data Aimg corresponding to the feature points $M_{vi}$ ($x_{Vi}$, $y_{Vi}$) in the image relevant to the virtual image data Vimg, it is possible to calculate $h_1$ through $h_8$. As a result, by using $h_1$ through $h_8$, the projection transform matrix Hcp can be calculated.

When the calculation of projection transform matrix Hcp is completed, the process proceeds to step S207.

In step S207, the correction information calculating unit 150 calculates the four correction points relevant to the contents image data Aimg corresponding to the four corners of the trapezoid correction rectangle C2 of step S203. The method of calculating the correction points is described in detail with reference to FIGS. 9A and 9B.

FIGS. 9A and 9B illustrate the relationship between the virtual image data Vimg and the projector image data Pimg. FIG. 9A illustrates the points at the four corners of the trapezoid correction rectangle in the image relevant to the virtual image data Vimg. FIG. 9B illustrates four correction points in an image relevant to the contents image data Aimg.

In FIG. 9A, the four corner points (URv, ULv, DRv, and DLv in FIG. 9A) in the trapezoid correction rectangle C2 calculated in step S203 is extracted. Next, in FIG. 9B, the four correction points (URva, ULva, DRva, and DLva in FIG. 9B) in the image relevant to the contents image data Aimg corresponding to the four corner points are calculated with the use of the projection transform matrix Hcp calculated at step S206.

When the calculation of the four correction points is completed, the process proceeds to step S208.

In step S208 of FIG. 6, the correction information calculating unit 150 calculates a trapezoid correction conversion matrix Hpp for deforming the four corner points (URa, etc., of FIG. 9B) in the image relevant to the contents image data Aimg into the four correction points (URva, etc.) calculated at step S207. The method of calculating the trapezoid correction conversion matrix Hpp is the same as step S206, and is thus not further described.

When the calculation of the trapezoid correction conversion matrix Hpp is completed, the trapezoid correction conversion matrix Hpp is stored as information relevant to the correction of the trapezoid correction conversion matrix Hpp, the process proceeds to "END" in FIG. 6, and the operation of calculating the correction information ends.

It is possible to generate projector image data Pimg in which the trapezoidal distortion is cancelled (resolved) by correcting the contents image data Aimg based on the trapezoid correction conversion matrix Hpp.

As described above, the correction information calculating unit 150 can calculate information relevant to correction necessary for resolving trapezoidal distortion of a projected image, based on distance data, regression plane data, and convex hull data.

Program and Recording Medium Recording Program

A program Pr according to an embodiment of the present invention executes a step of acquiring, by the imaging unit, image data by taking an image of an area including an object on which an image is projected, a step of calculating distance data relevant to the distance data between the imaging unit and the object based on the image data, a step of estimating a plane corresponding to the object based on the distance data, and a step of calculating information relevant to correction of an image to be projected based on the distance data and information relevant to the plane.

According to the above configuration, the same effects as those of the image processing apparatus according to an embodiment of the present invention are attained.

Furthermore, an embodiment of the present embodiment may be a computer-readable recording medium Md recording the program Pr. As the recording medium Md recording the program Pr, computer-readable media such as a flexible disk, a CD-ROM, and a memory card may be used.

Embodiments

A description is given of an image processing apparatus and an image processing method according to an embodiment of the present invention, by embodiments of a projector.

The image processing apparatus according to an embodiment of the present invention is not limited to an image processing apparatus used in a projector. The image processing apparatus may be applied to anything other than a projector, as long as information relevant to correction of a projected image can be calculated by performing image processing on an image obtained by taking an image of an area including the object.

First Embodiment

A description is given of an embodiment of the present invention by a projector according to a first embodiment.

Configuration of Projector—First Embodiment

Figure 10:
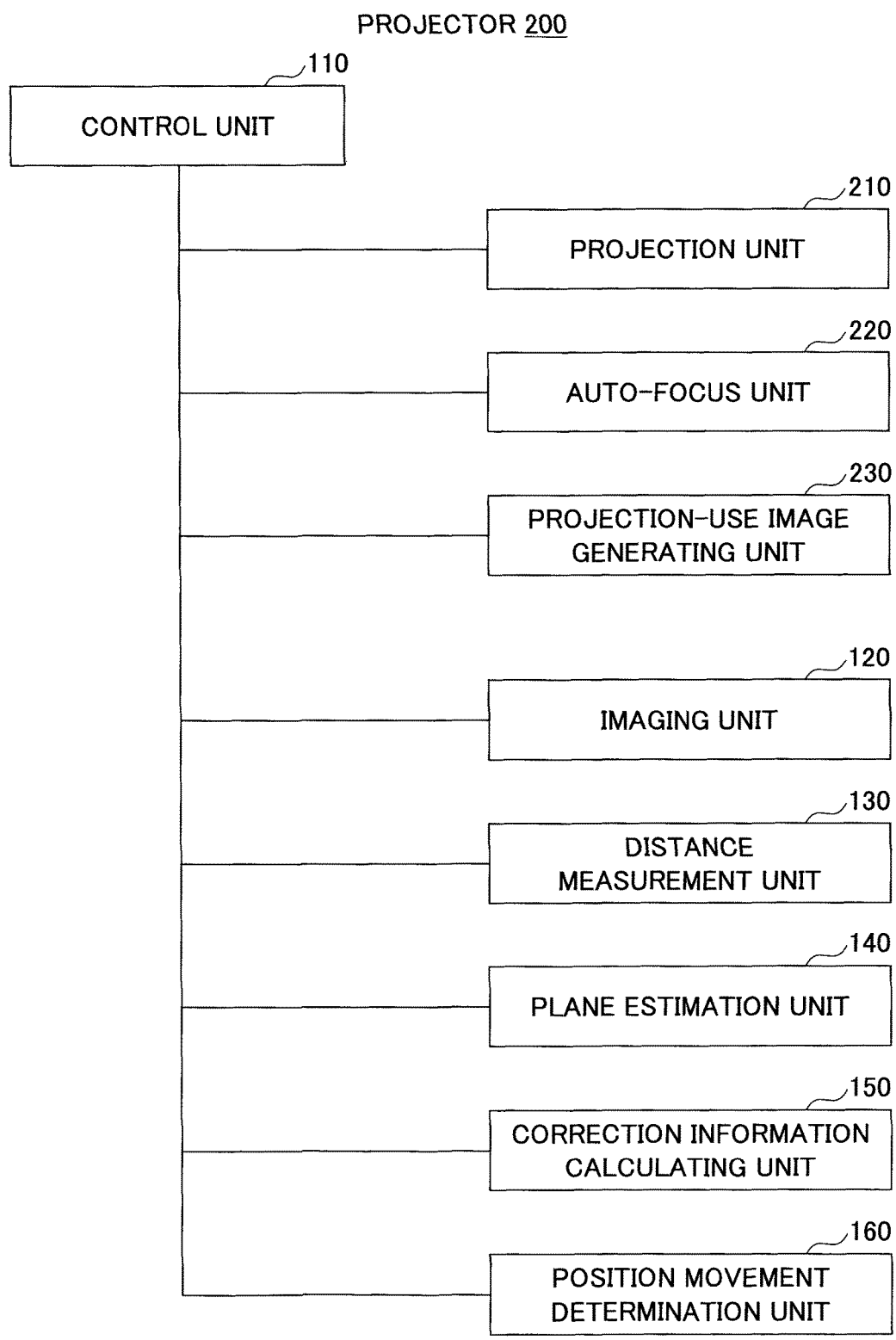
FIG. 10 is a schematic diagram of a projector according to a first embodiment.

FIG. 10 is a schematic diagram of a projector according to the present embodiment.

In FIG. 10, a projector 200 according to the present embodiment includes a projection unit 210, an auto-focus unit 220, and a projection-use image generating unit 230. Furthermore as the image processing apparatus, the projector 200 includes a control unit 110, an imaging unit 120, a distance measurement unit 130, a plane estimation unit 140, a correction information calculating unit 150, and a position movement determination unit 160.

The projector 200 projects an image onto a projection object, and estimates a plane corresponding to a projection object. Furthermore, the projector 200 adjusts the focus of the projection lens based on the estimated plane to correct the image to be projected.

The projection unit 210 is for projecting an image onto a projection object from a projection lens of a projector. The auto-focus unit 220 is for bringing the projection lens of the projector into focus with the projection object. The projection-use image generating unit 230 is for generating an image to be projected by the projector.

The position movement determination unit 160 is for determining whether the relationship between the positions of the projector and the projection object has changed (whether the projector and/or the projection object has moved). The control unit 110, etc., are the same as those in FIG. 1, and are thus not further described.

Operation of Correcting Projection—First Embodiment

Figure 11:
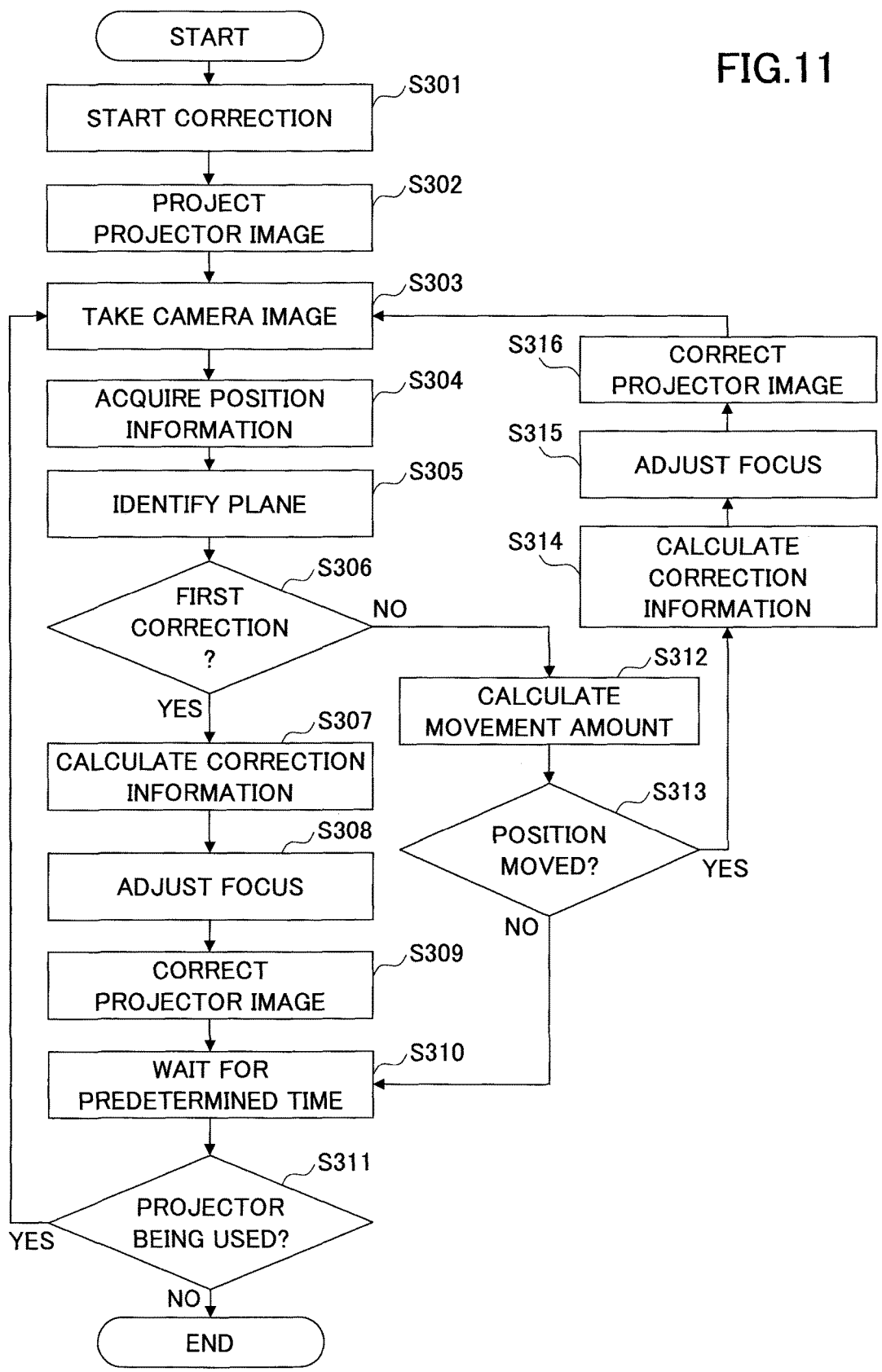
FIG. 11 is a flowchart of an example of a projection operation performed by the projector according to the first embodiment.

A description is given of the operation of correcting an image to be projected performed by the projector 200, with reference to FIGS. 11 through 13C. FIG. 11 is a flowchart of an example of a projection operation performed by the projector 200 according to the present embodiment. FIGS. 12A through 12C illustrate an example of extracting feature points and corresponding points of a projected image. FIGS. 13A through 13C illustrate correction of an image to be projected.

In FIG. 11, the control unit 110 of the projector 200 outputs an instruction of operation to the projection unit 210, etc., to start correction of the operation of projecting the image, according to input from an operation panel (step S301). Subsequently, the process proceeds to step S302.

In step S302, the projection unit 210 projects contents image data Aimg as an image of projector image data Pimg onto the projection object from the projection lens. Subsequently, the process proceeds to step S303.

In step S303, the projection unit 210 takes an image of the area including the projection object, and acquires the camera image data Cimg. When the acquisition is completed, the process proceeds to step S304.

In step S304, the distance measurement unit 130 calculates the distance from the projector (imaging unit 120) to the projection object (corresponding points), based on the camera image data Cimg. The method of calculating the distance is described in detail with reference to FIGS. 12A through 12C.

Figure 12A:
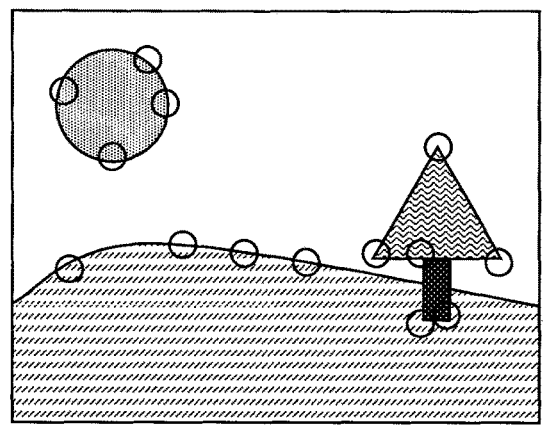
FIGS. 12A through 12C illustrate an example of extracting feature points and corresponding points of a projected image according to the first embodiment.
Figure 12B:
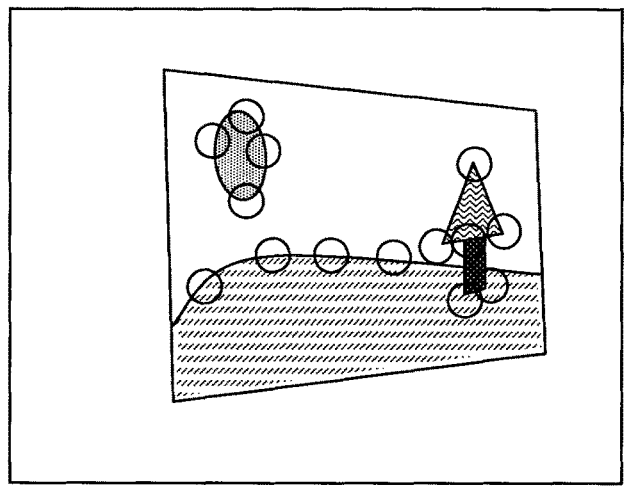
Figure 12C:
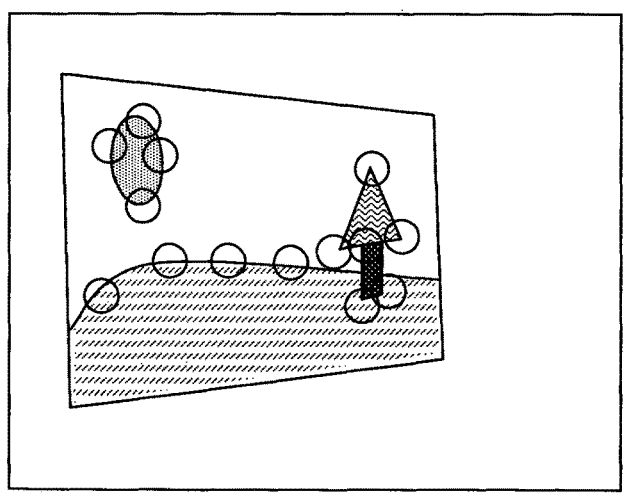

FIGS. 12A through 12C illustrate feature points and corresponding points in an image to be projected. FIG. 12A illustrates an image relevant to the contents image data Aimg. FIG. 12B illustrates an image relevant to the camera image data Cimg acquired by the standard camera of the stereo camera of the imaging unit 120. FIG. 12C illustrates an image relevant to the camera image data Cimg acquired by the reference camera.

In FIG. 12A, the feature points (○ in FIG. 12A) of an image relevant to the contents image data Aimg are shown. The distance measurement unit 130 calculates the disparity Δ relevant to the corresponding points (○ in FIGS. 12B and 12C) corresponding to the feature points (FIG. 12A), from images relevant to the camera image data Cimg of the standard camera and the reference camera. Next, the distance measurement unit 130 calculates the absolute coordinates (XYZ coordinates) of the corresponding points, and acquires first distance data Dd1. Here, the method of calculating the absolute coordinates of the corresponding points are the same as the operation of measuring the distance described above, and is thus not further described. When the acquisition of the first distance data Dd1 is completed, the process proceeds to step S305.

In step S305 of FIG. 11, the plane estimation unit 140 estimates the plane corresponding to the projection object based on the acquired first distance data Dd1. The method of estimating the plane is the same as the operation of estimating the plane described above, and is thus not further described. When the estimation of the plane is completed, the process proceeds to step S306.

In step S306, the control unit 110 determines whether the correction of the operation of projection is the first time (first correction after turning on the power of the projector). When the correction is the first time, the process proceeds to step S307. Otherwise, the process proceeds to step S312.

In step S307, the correction information calculating unit 150 calculates the virtual image data Vimg based on the camera image data Cimg acquired by the imaging unit 120 and the plane estimated by the plane estimation unit 140. Furthermore, the correction information calculating unit 150 calculates information (trapezoid correction conversion matrix Hpp, etc.) relevant to correction of the projector image data Pimg, based on the virtual image data Vimg and the distance data. The method of calculating information relevant to correction is described in detail with reference to FIGS. 13A through 13C.

FIGS. 13A through 13C illustrate an operation of correcting an image to be projected. FIG. 13A illustrates an image relevant to the virtual image data Vimg before correction. FIG. 13B illustrates an image relevant to the projector image data Pimg after correction. FIG. 13C illustrates an image relevant to the virtual image data Vimg after correction.

In FIG. 13A, the correction information calculating unit 150 generates an image relevant to the virtual image data Vimg based on the camera image data Cimg and an estimated plane. Furthermore, the correction information calculating unit 150 calculates a convex hull C1 and a trapezoid correction rectangle C2 based on an image relevant to the virtual image data Vimg. Next, in FIG. 13B, the correction information calculating unit 150 calculates a projection transform matrix Hcp and a trapezoid correction conversion matrix Hpp based on the convex hull C1 and the trapezoid correction rectangle C2. The method of calculating the projection transform matrix Hcp, etc., is the same as the operation of calculating correction information described above, and is thus not further described.

When the calculation is completed, the process proceeds to step S308.

In step S308 of FIG. 11, the auto-focus unit 220 brings the projection lens into focus with the projection object by moving the projection lens, based on the calculated first distance data Dd1 (step S304) and/or information relevant to the estimated plane (step S305). The focusing method may be performed by calculating, with the distance measurement unit 130, the first distance data Dd1 relevant to the distance of the projection object with respect to the center position of the projected area, and adjusting the focus based on the calculated first distance data Dd1. The center position may be the average value of points (positions) indicating the maximum value and the minimum value of the X coordinates and Y coordinates in the group of three-dimensional points. Furthermore, the center position may be the average value (or centroid) of all points in the group of three-dimensional points.

When the focusing is completed, the process proceeds to step S309.

In step S309 of FIG. 11, the projection-use image generating unit 230 corrects the image relevant to the projector image data Pimg to be projected. Specifically, the projection-use image generating unit 230 corrects (deforms) the image relevant to the contents image data Aimg based on the calculated trapezoid correction conversion matrix Hpp, and generates an image relevant to the projector image data Pimg in which the trapezoidal distortion is resolved (FIG. 13B). FIG. 13C illustrates the image relevant to the virtual image data Vimg when this corrected projector image data Pimg is projected, in which the trapezoidal distortion is cancelled (resolved) when viewed from the front of the projection object.

When the correction is completed, the process proceeds to step S310.

In step S310, the control unit 110 determines whether a predetermined length of time has elapsed by a time counter for measuring predetermined time intervals. When a predetermined time elapses, the time counter is reset, and the process proceeds to step S311. When the predetermined time has not elapsed, it waits until the predetermined time elapses.

In step S311, the control unit 110 determines whether the projector is being used. When the projector is being used, the projection operation is corrected at predetermined time intervals, and therefore the process returns to step S303. Otherwise, the process proceeds to "END" in FIG. 11, and the correction operation ends.

In step S312, the position movement determination unit 160 calculates the change amount in the relationship between the positions of the projector and the projection object. Specifically, the plane estimation unit 140 newly estimates a plane, and the position movement determination unit 160 can calculate the change amount in the relationships relevant to the positions (distance, horizontal angle, elevation angle, etc.) based on the comparison between the previously estimated plane and the newly estimated plane. The position movement determination unit 160 may use the movement amount of the position of the centroid (center) of the trapezoid correction rectangle based on the estimated plane, as the change amount.

When the calculation is completed, the process proceeds to step S313.

In step S313, the position movement determination unit 160 determines whether the relationship between the positions of the projector and the projection object has changed. Specifically, the position movement determination unit 160 can determine that the relationship between the positions has changed when the change amount calculated at step S312 exceeds a predetermined change amount. A predetermined change amount is the distance between the projector and the projection object, or a value corresponding to the depth of field. Furthermore, the predetermined change amount may be a value determined by numerical calculations or experiments.

Subsequently, when it is determined that the relationship between the positions has changed, the process proceeds to step S314. When it is determined that the relationship between the positions has not changed, the process proceeds to step S310.

In step S314, the correction information calculating unit 150 calculates the information relevant to correction similar to step S307. When the calculation is completed, the process proceeds to step S315.

In step S315, the auto-focus unit 220 performs focusing similar to step S309. When the focusing is completed, the process proceeds to step S316.

In step S316, the projection-use image generating unit 230 corrects the image relevant to the projector image data Pimg similar to step S308. When the correction is completed, the process returns to step S303.

As described above, the projector according to the present embodiment can correct an image to be projected (image relevant to projector image data Pimg) while the image is being projected when the relationship between the positions of the projector and the projection object has changed, without interrupting the operation of projecting the image. Furthermore, by comparing positions of plural planes that are estimated by the plane estimation unit 140 at predetermined time intervals, the projector can determine whether the relationship between the projector and the projection object has changed. Furthermore, when it is determined that the relationship between the positions has changed, the projector can correct the image to be projected without interrupting the operation of projecting images.

Second Embodiment

A description is given of an embodiment of the present invention by a projector according to a second embodiment.

Configuration of Projector—Second Embodiment

Figure 14:
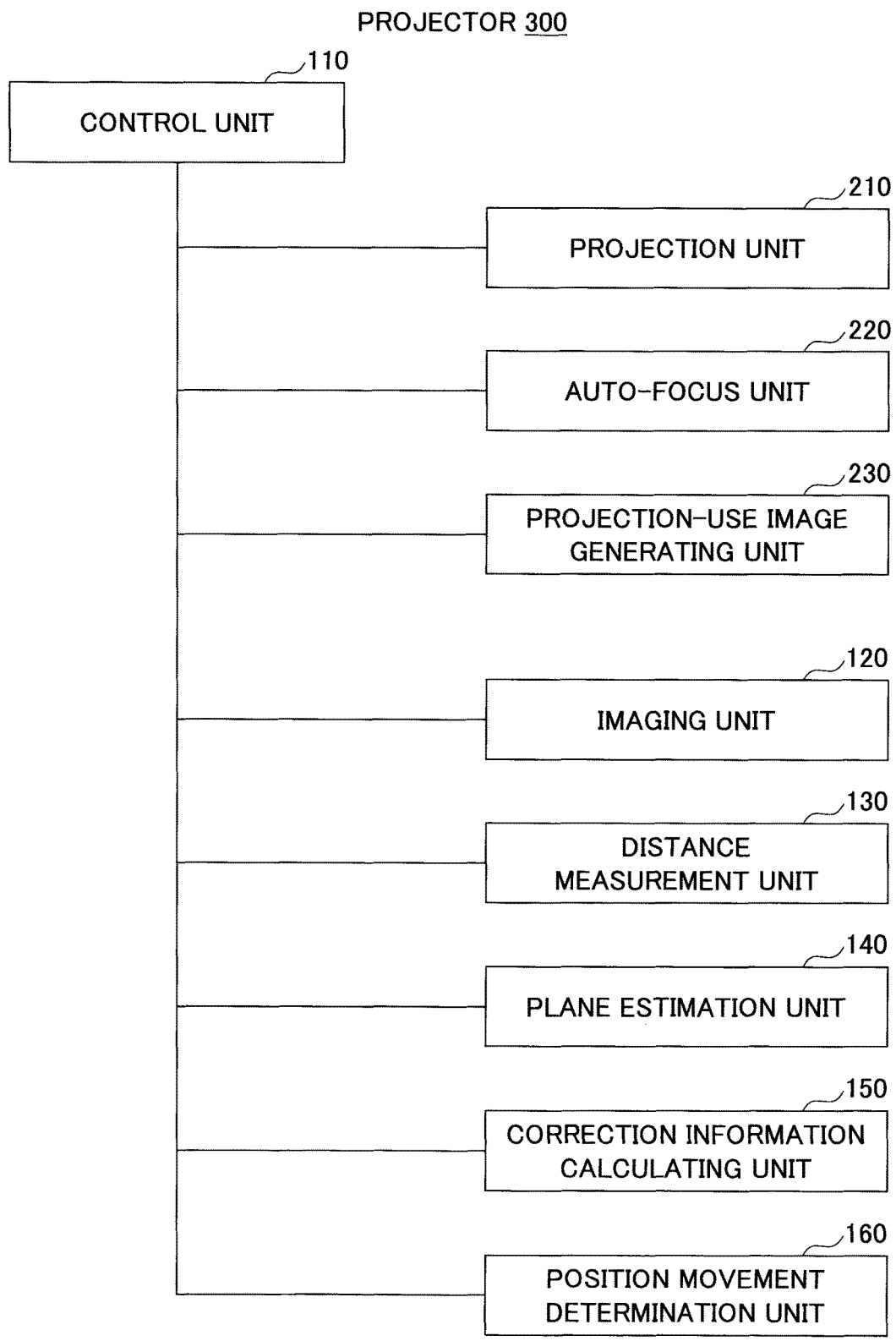
FIG. 14 is a schematic diagram of a projector according to a second embodiment.

FIG. 14 is a schematic diagram of a projector according to the present embodiment.

In FIG. 14, the configuration of a projector 300 is the same as that of the first embodiment (FIG. 10), and is thus not further described.

Operation of Extracting Feature Points—Second Embodiment

A description is given of an operation of extracting feature points performed by the distance measurement unit 130.

In the present embodiment, a pattern image is embedded into the image to be projected (image relevant to projector image data Pimg) as an electronic watermark, and the pattern image is exacted as feature points. As the pattern image, dot patterns may be used.

Based on the pattern image, the operation of extracting feature points is described in detail with reference to FIGS. 15A through 15C.

Figure 15A:
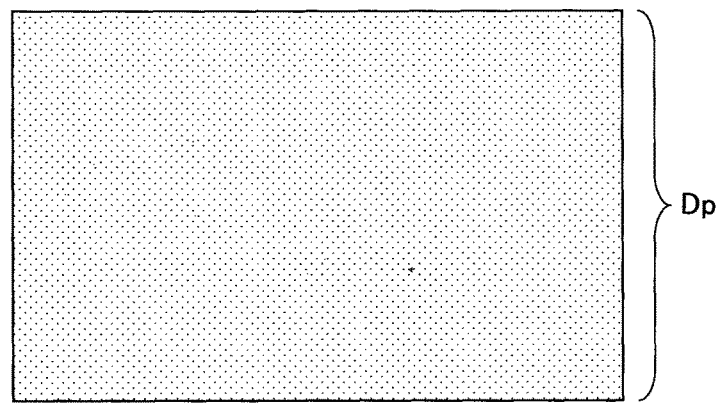
FIGS. 15A through 15C illustrate a dot pattern according to the second embodiment.
Figure 15B:
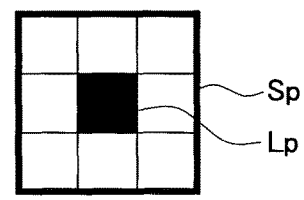
Figure 15C:
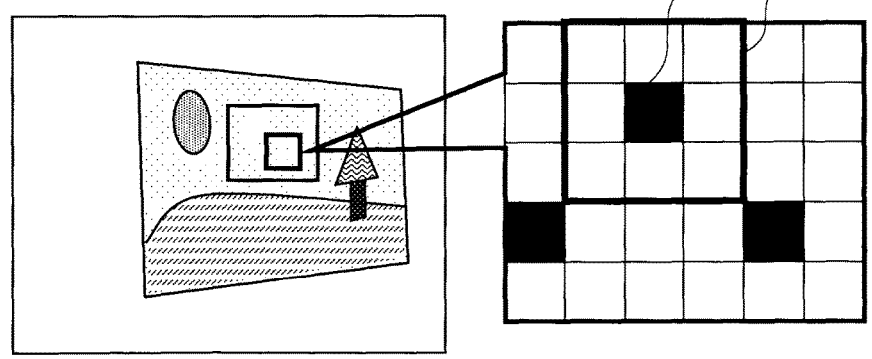

FIGS. 15A through 15C illustrate an example where a dot pattern is used as a pattern image. FIG. 15A illustrates a dot pattern Dp to be embedded as an electronic watermark. FIG. 15B indicates a search pattern Sp used for extracting feature points. FIG. 15C illustrates an image in which the dot pattern is embedded.

In FIG. 15C, in an image (camera image data Cimg) that is projected with the embedded dot pattern Dp (FIG. 15A), the pixels corresponding to the dot pattern Dp and the surrounding pixels have different image information (color, brightness, edge strength, etc.), and the pixels corresponding to the dot pattern Dp are isolated points. In the present embodiment, the search pattern Sp in FIG. 15B is used to extract these isolated points Lp, and use the extracted points as feature points. Accordingly, in a case of projecting an image with a small number of feature points (or feature points cannot be extracted), the pattern image (dot pattern) is projected as an electronic water mark, so that feature points can be extracted.

Third Embodiment

A description is given of an embodiment of the present invention by a projector according to a third embodiment.

Configuration of Projector—Third Embodiment

Figure 16:
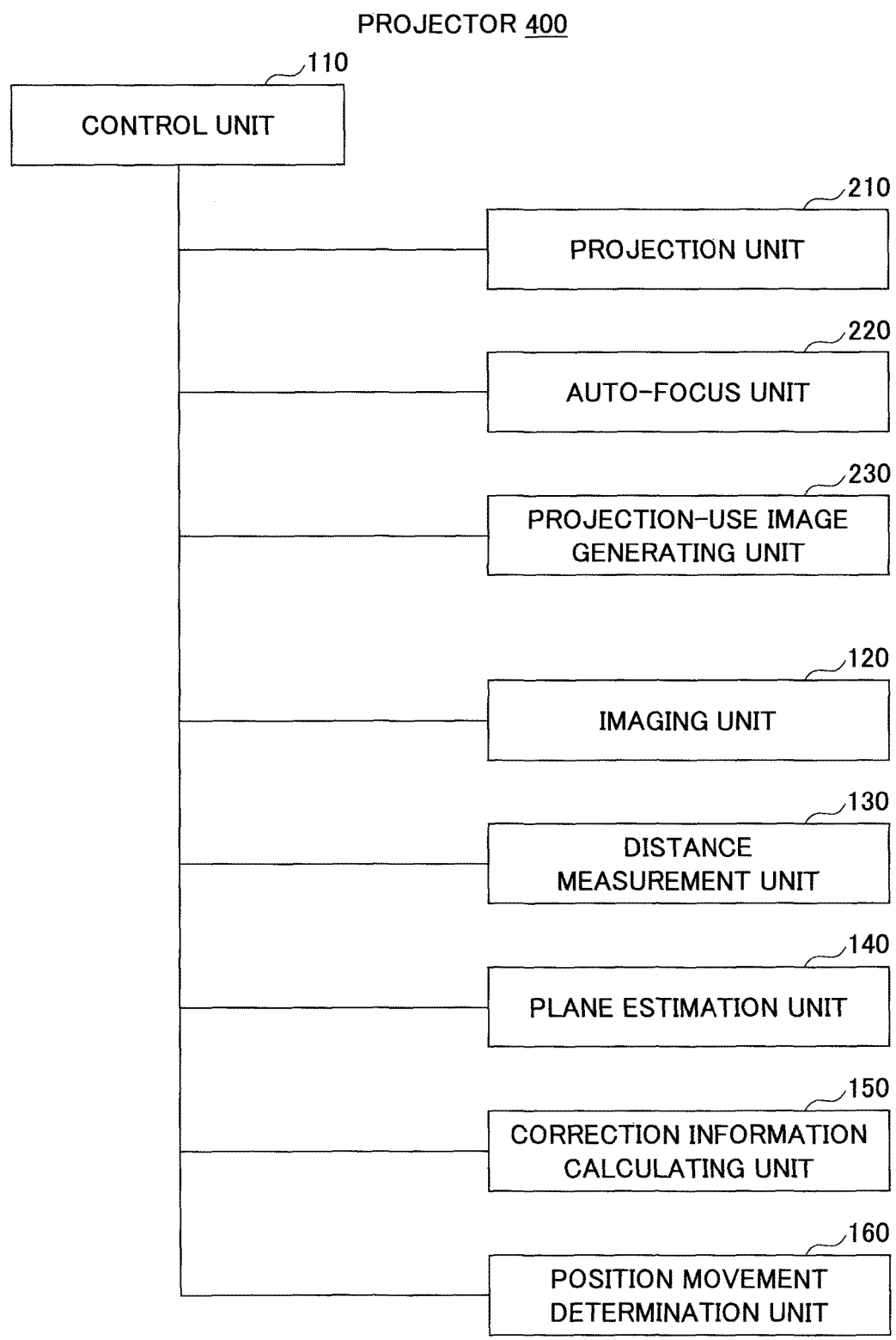
FIG. 16 is a schematic diagram of a projector according to a third embodiment.

FIG. 16 is a schematic diagram of a projector according to the present embodiment.

In FIG. 16, the configuration of a projector 400 is the same as that of the first and second embodiments, and is thus not further described.

Operation of Estimating Plane by Normal Vectors—Third Embodiment

A description is given of an operation performed by the plane estimation unit 140 of calculating normal vectors by a polygon mesh and estimating a plane corresponding to a projection object and based on the normal vectors. The basic operation is the same as the operation of estimating a plane described above, and is thus not further described.

Figure 17:
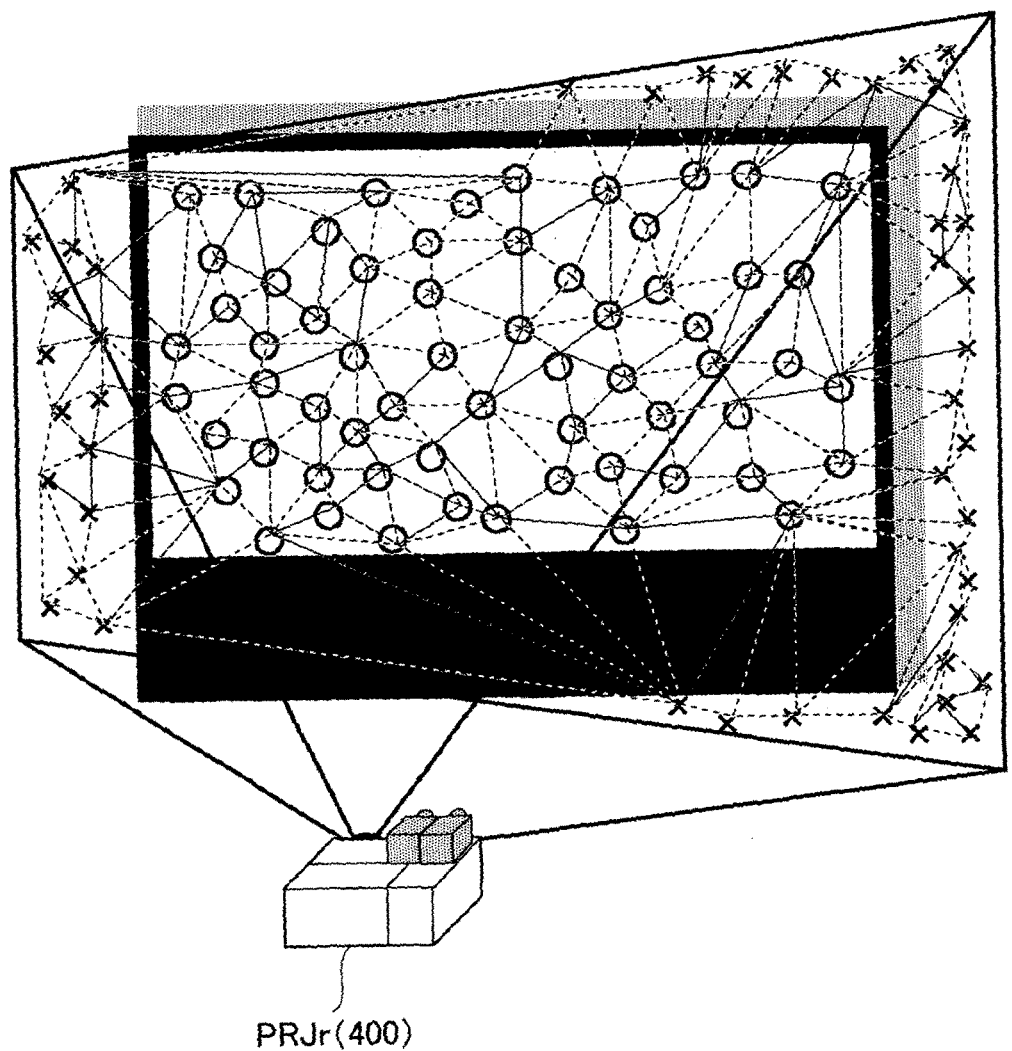
FIG. 17 illustrates a polygon mesh according to the third embodiment.

In the present embodiment, a polygon mesh corresponding to a group of three-dimensional points is calculated from the absolute coordinates (second distance data D2) of the group of three-dimensional points calculated by the distance measurement unit 130. The polygon mesh is an element expressing an object by a combination of polygons such as triangles. FIG. 17 illustrates a group of three-dimensional points expressed by a polygon mesh. In the present embodiment, the group of three-dimensional points is expressed by a polygon mesh of triangles.

Next, an operation of estimating a plane corresponding to the projection object based on the group of three-dimensional points expressed by a polygon mesh is described with reference to FIG. 18.

Figure 18:
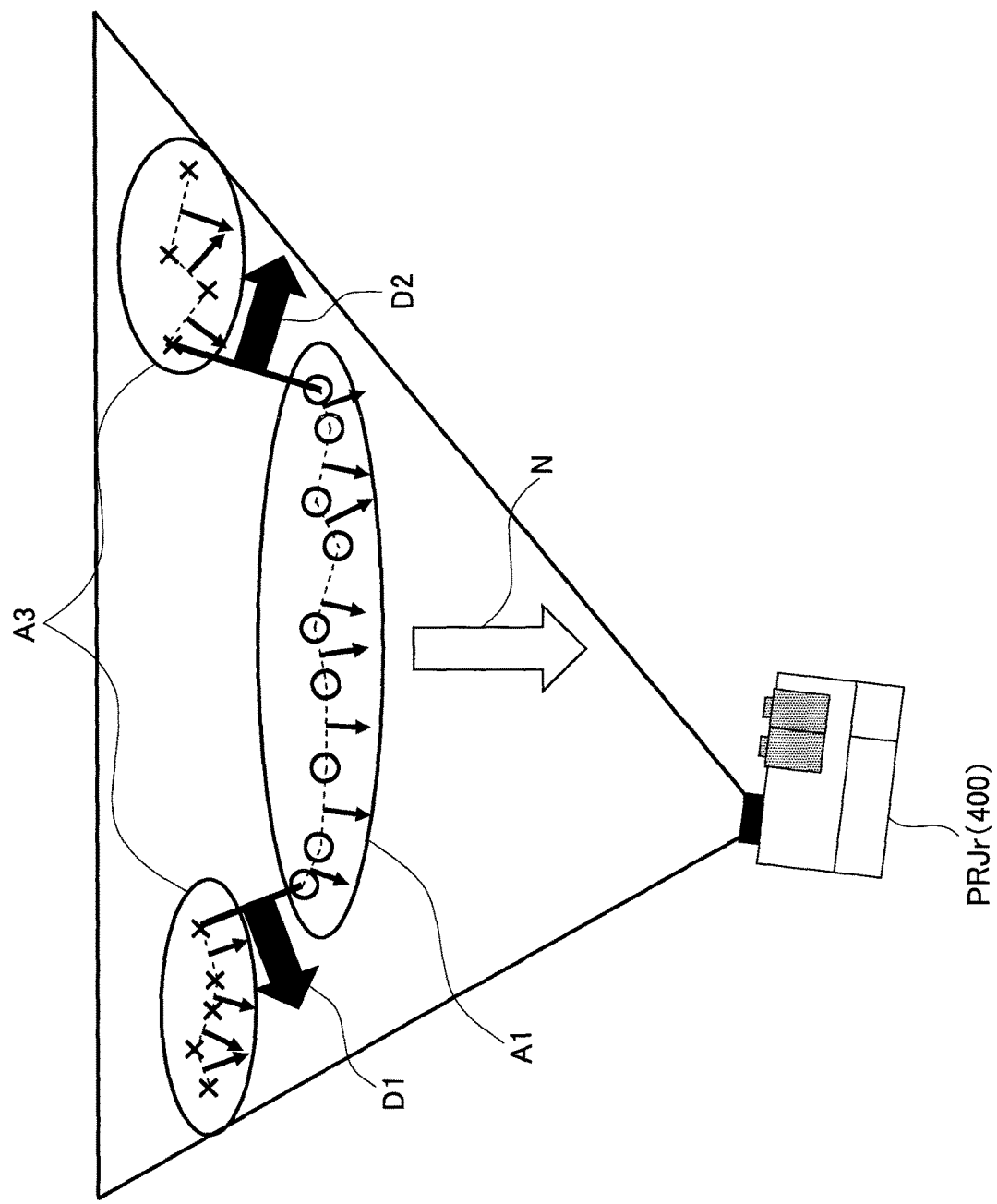
FIG. 18 illustrates a method of estimating a plane from normal vectors according to the third embodiment.

FIG. 18 indicates normal vectors in a polygon mesh calculated based on absolute coordinates (second distance data D2) of the group of three-dimensional points. In the present embodiment, normal vectors of the elements in a polygon mesh are obtained, a normal vector N is calculated by averaging the normal vectors of the elements, and a plane that is perpendicular to the average normal vector N is estimated to be the plane corresponding to the projection object. Furthermore, by comparing the average normal vector N with the normal vectors of the elements, it is possible to detect an area in which projection is possible in the projection object (for example, the area of the screen).

Specifically, the operation involves detecting corresponding points relevant to normal vectors of the elements (D1 and D2) at which the differences between the directions of the normal vectors of the elements and the direction of the average normal vector N are outside a predetermined range, and determining the positions of the corresponding points as corresponding points positioned along the contour of the projection object. Accordingly, it is possible to perform the estimation of a plane and the calculation of an area where projection is possible (contour) of the projection object by a single calculation operation, without performing the estimation by recursive approximation in the operation of estimating a plane.

Furthermore, the average normal vector is sequentially calculated from the polygon mesh near the center of an image that has been taken, and when the difference between the average normal vector being sequentially calculated and the calculated normal vector exceeds a predetermined value, it can be estimated that the plane is positioned on the contour of the projection object.

Furthermore, the normal vector may be calculated from formula 16.

$$H = N_i \left( R - \frac{tN^T}{z} \right) N_b^{-1}$$ Formula 16

In formula 16, H is the projection conversion matrix in images taken by the standard camera and the reference camera of a stereo camera (imaging unit), $N_b$ and $N_i$ are internal parameters of the standard camera and the reference camera, R and t are a rotation vector and a parallel movement vector expressing the relative positions and orientations of the standard camera and the reference camera, z is the distance from the stereo camera to the projection object, and N is the normal vector from the estimated plane to the standard camera.

Fourth Embodiment

A description is given of an embodiment of the present invention by a projector system according to a fourth embodiment.

Configuration of Projector System—Fourth Embodiment

Figure 19:
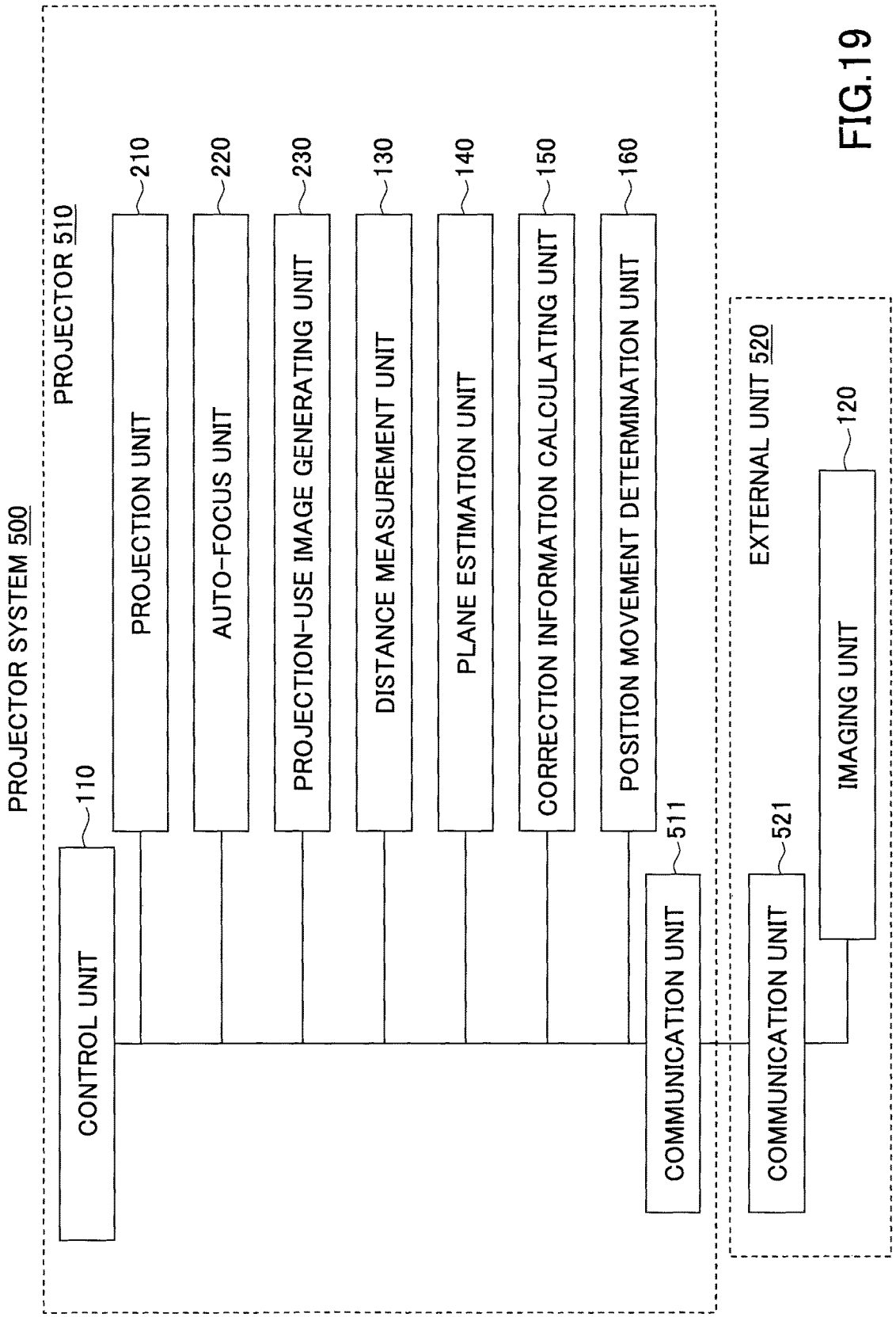
FIG. 19 is a schematic diagram of projector system according to a fourth embodiment.

FIG. 19 is a schematic diagram of a projector system according to the present embodiment.

Figure 20:
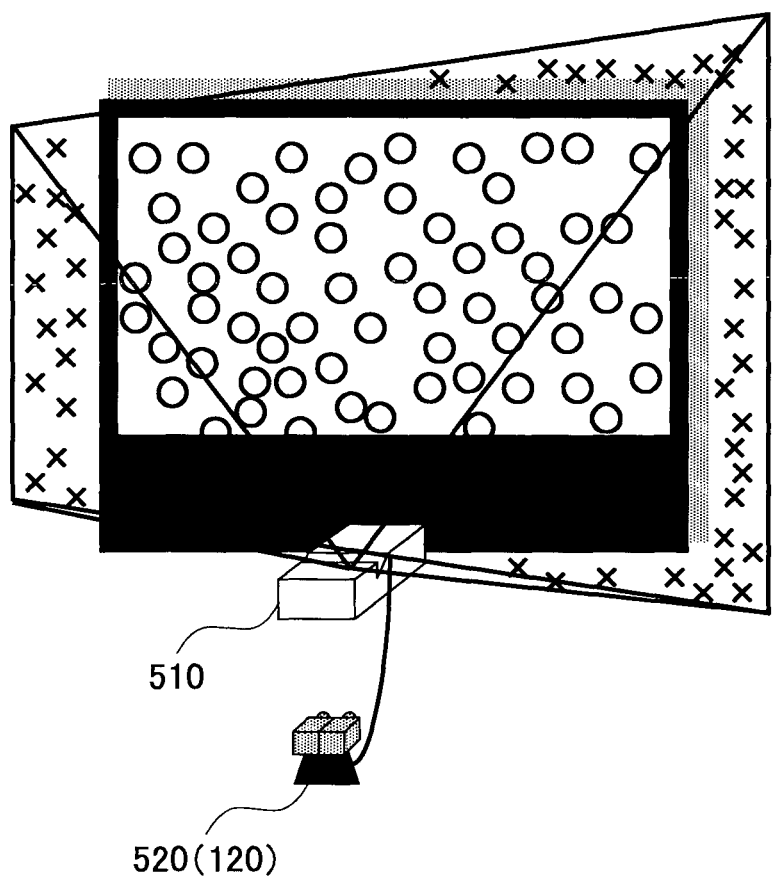
FIG. 20 illustrates an operation of projecting an image according to the fourth embodiment.

FIG. 20 illustrates an operation of projecting an image according to the fourth embodiment.

In FIG. 19, a projector system 500 includes a projector 510 and an external unit 520. The basic configuration of the projector 510 is the same as that of the first through third embodiments, and is thus not further described.

The projector 510 includes a communication unit 511 in the present embodiment. Similarly, the external unit 520 includes a communication unit 521. The projector 510 and the external unit 520 can communicate with each other in a wired or wireless manner by the communication unit 511 and the communication unit 521. The external unit 520 can use cloud computing.

The external unit 520 includes the imaging unit 120. The external unit 520 can output data relevant to the image taken by the imaging unit 120 to the projector 510.

Imaging Operation—Fourth Embodiment

In a projector that is positioned near the projection object (a short focus projector, a proximate camera, etc.), a wide-angle lens (a lens with a wide field angle, a lens with a short focal length, etc.) is used to take an image of the projected image. In this case, it is necessary to correct the Seidel aberration (spherical aberration, coma aberration, astigmatism, image curvature, distortion aberration, etc.) of the image that has been taken.

In the projector system 500 according to an embodiment of the present invention, the imaging unit 120 of the external unit 520 is used in the projector positioned near the projection object, and therefore the Seidel aberration does not need to be corrected.

Furthermore, in the projector system 500, the imaging unit 120 of the external unit 520 is used, and therefore the projector 510 can be reduced in size and weight, and can also be simplified.

Furthermore, the external unit 520 can use the imaging unit of a PC, etc. In the case of making presentations using the projector 510, the PC used at the presentation includes an imaging unit. The external unit 520 can be an imaging unit of a PC used at the presentation.

According to an embodiment of the present invention, in an image processing apparatus, information relevant to correction of an image to be projected can be calculated by estimating a plane corresponding to the object on which an image is projected.

The image processing apparatus, the projector and a projector system including the image processing apparatus, and the image processing method are not limited to the specific embodiments described herein, and variations and modifications may be made without departing from the scope of the present invention.

The present application is based on Japanese Priority Patent Application No. 2011-178809, filed on Aug. 18, 2011, the entire contents of which are hereby incorporated herein by reference.

The invention claimed is:

1. An image processing apparatus comprising:
   an imaging unit configured to take an image of an area including an object on which an image is projected and acquire image data;
   a distance measuring unit configured to calculate distance data relevant to a distance between the object and the imaging unit based on the image data;
   a plane estimating unit configured to estimate a plane corresponding to the object based on the distance data; and
   a correction information calculating unit configured to calculate correction information including plural points on a plane relevant to correction of an image to be projected based on the distance data and plane information relevant to the plane, to calculate convex hull data relevant to a convex hull encompassing the plural points, to calculate a correction polygon based on the calculated convex hull data, and to calculate a correction matrix from extracted feature points within the correction polygon; and
   a position movement determination unit configured to determine whether a positional relationship between positions of the imaging unit and the object has changed,
   wherein
   the imaging unit takes images of the area at predetermined time intervals, and acquires plural contents image data items,
   the distance measuring unit calculates plural first distance data items corresponding to the predetermined time intervals based on the plural contents image data items,
   the plane estimating unit estimates plural planes based on the plural first distance data items and acquires three-dimensional coordinates including at an inside of the plural contents image data items, and
   the position movement determination unit determines whether the positional relationship between the positions of the imaging unit and the object has changed by comparing one plane with another plane corresponding to the predetermined time intervals among the plural planes.

2. The image processing apparatus according to claim 1, wherein
   the correction information calculating unit calculates the correction information based on the positional relationship that has changed, when the position movement determination unit determines that the positional relationship has changed.

3. The image processing apparatus according to claim 1, wherein
   the image to be projected includes a pattern image, and
   the distance measuring unit extracts the pattern image, and calculates the distance data corresponding to the pattern image.

4. The image processing apparatus according to claim 1, wherein
   the distance measuring unit calculates plural second distance data items corresponding to the area, and
   the plane estimating unit calculates plural normal vectors based on the plural second distance data items, and estimates the plane based on the plural normal vectors.

5. A projector comprising:
   the image processing apparatus according to claim 1;
   a projection image generating unit configured to correct the image to be projected based on the correction information; and
   a projecting unit configured to project the image to be projected that has been corrected by the projection image generating unit.

6. A projector system comprising:
   the projector according to claim 5, wherein
   the projection image generating unit communicates with the projector in a wired or wireless manner.

7. An image processing method comprising:

taking, by an imaging unit, an image of an area including an object on which an image is projected, and acquiring image data;

calculating distance data relevant to a distance between the object and the imaging unit based on the image data;

estimating a plane corresponding to the object based on the distance data;

calculating correction information including plural points on a plane relevant to correction of an image to be projected based on the distance data and plane information relevant to the plane, to calculate convex hull data relevant to a convex hull encompassing the plural points, to calculate a correction polygon based on the calculated convex hull data, and to calculate a correction matrix from extracted feature points within the correction polygon, and determining whether a positional relationship between positions of the imaging unit and the object has changed, wherein the taking the image by the imaging unit includes taking images of the area at predetermined time intervals, and acquiring plural contents image data items, the calculating of the distance data includes calculating plural first distance data items corresponding to the predetermined time intervals based on the plural contents image data items; and the estimating of the plane includes estimating plural planes corresponding to the predetermined time intervals based on the plural first distance data items and acquires three-dimensional coordinates including at an inside of the plural contents image data items, the determining includes determining whether the positional relationship between the positions of the imaging unit and the object has changed by comparing one plane with another plane corresponding to the predetermined time intervals among the plural planes.

8. The image processing method according to claim 7, wherein the calculating of the correction information includes calculating the correction information based on the positional relationship that has changed, when it is determined that the positional relationship has changed.

9. A non-transitory computer-readable recording medium storing a program for causing a computer to execute the image processing method according to claim 7.

* * * * *